(12) United States Patent
Smith

(10) Patent No.: US 7,398,465 B2
(45) Date of Patent: Jul. 8, 2008

(54) SYSTEM AND METHOD FOR IDENTIFYING, CLASSIFYING, EXTRACTING AND RESOLVING HIDDEN ENTITIES

(75) Inventor: Gregory L. Smith, Renton, WA (US)

(73) Assignee: The Boeing Company, Chicago, IL (US)

( * ) Notice: Subject to any disclaimer, the term of this patent is extended or adjusted under 35 U.S.C. 154(b) by 698 days.

(21) Appl. No.: 10/177,179

(22) Filed: Jun. 20, 2002

(65) Prior Publication Data

US 2004/0205601 A1    Oct. 14, 2004

(51) Int. Cl.
*G06F 17/00* (2006.01)
(52) U.S. Cl. .................. 715/250; 715/201; 715/205
(58) Field of Classification Search ............. 715/738, 715/866, 505, 273; 713/189, 200, 201, 100, 713/193, 176, 179; 726/4; 380/201, 202, 380/203
See application file for complete search history.

(56) References Cited

U.S. PATENT DOCUMENTS

| | | | |
|---|---|---|---|
| 5,822,436 A | | 10/1998 | Rhoads |
| 5,883,623 A | * | 3/1999 | Cseri .................. 715/866 |
| 5,950,168 A | * | 9/1999 | Simborg et al. ............ 705/3 |
| 5,987,611 A | * | 11/1999 | Freund .................. 726/4 |
| 6,289,108 B1 | | 9/2001 | Rhoads |
| 6,378,071 B1 | * | 4/2002 | Sasaki et al. ............. 713/165 |
| 6,766,458 B1 | * | 7/2004 | Harris et al. ................ 726/6 |
| 2002/0144153 A1 | * | 10/2002 | LeVine et al. ............. 713/201 |
| 2002/0162015 A1 | * | 10/2002 | Tang .................... 713/200 |
| 2003/0034999 A1 | * | 2/2003 | Coughlin et al. ............ 345/738 |
| 2004/0093506 A1 | * | 5/2004 | Grawrock et al. ........... 713/189 |

OTHER PUBLICATIONS

Microsoft Office 6-in-1 new edition by Carl Townsend et al. public 1994 by Que Corporation, Indiana USA pp. 55-57, 575-578, 384-386, 430, 491, 401, 563, 454-455, 449, 472-476, 497-498, 448-453, 501-502, 713-717, 439, 475, 407.*
International search report, Dec. 30, 2003.
Wilkinson, T. et al., "*Trustworthy access control with untrustworthy Web servers*", proceedings of the fifteenth annual Computer Security Applications Conference (ACSAC '99), Dec. 6-10, 1999, pp. 12-21, XP010368614.
Google Groups, "*Deleted Text still exist in File*", Oct. 2, 2000, XP002264892, Microsoft.public.win2000.applications et al 'retrieved on Dec. 11, 2003!, messages 6-9.

* cited by examiner

*Primary Examiner*—Rachna Singh
*Assistant Examiner*—Quoc A Tran
(74) *Attorney, Agent, or Firm*—Dykema Gossett LLC

(57) ABSTRACT

A method for identifying, classifying, extracting and resolving hidden entities from a data file includes searching for an executing copy of an application associated with the data file, initiating the application in a background if the application is not running, opening the data file for reading only, examining the data file for hidden entities, generating an examination log of incidents of hidden entities, and optionally, resolving the incidents of hidden entities.

42 Claims, 54 Drawing Sheets

ExaminePPT / ResolvePPT —400
- In Process Setup —401
- Write Power Point Header —402
- Setup Slide List —403
- Write Presentation Header —404
- Ungroup Presentation —405
- For 1 to Number of Features —406
  (e.g 1 of 25 Power Point Data hiding Algorithms
      <reference following slides in this presentation.)
  Do
    Exit on User Cancel
    If feature enabled
      Execute Feature Algorithm
    Else
      Write Feature Disabled
    End If
  Update Progress Bar —407
  Next algorithm

- Write Completion Header —408
- Write Summary —409
- In Process Cleanup —410

*FIG. 4*

ReportPPTPresInformation — 800

Write Name      Write Full Name
Write Path      Write Template Name — 801
Write Read Only Set    Write Has Title Master set
For each Tag — 802
   If Tag has a value — 803
     If stringlength of value > user setting — 804
       Report Data Hiding Possibility — 805
Next Tag For each Builtin Property — 810
   If Builtin Property has a value — 811
     If stringlength of value > user setting — 812
       Report Data Hiding Possibility — 813
Next Builtin Property For each Custom Property — 820
   If Custom Property has a value — 821
     If stringlength of value > user setting — 822
       Report Data Hiding Possibility — 823
Next Custom Property

*FIG. 8*

3. Report General PowerPoint Presentation Information (Property text greater than 40 characters) at 07:05:48 AM

Name: color_test.ppt
Full Name: C:\Documents and Settings\smithg\Desktop\data hiding\color_test.ppt
Path: C:\Documents and Settings\smithg\Desktop\data hiding
Template Name: Artsy
Read Only: FALSE
Title Master: TRUE Builtin Document Properties Summary:
    Property: Title    Value: PowerPoint Presentation
*WARNING 1 * Document Property with a Significant Amount of Text Located, User Examination Suggested: Builtin Property
    Property: Template    Value: C:\Program Files\Office2K\Templates\Presentation Designs\Artsy.pot
    Property: Last author    Value: Greg Smith Property: Number of characters (with spaces)    Value: <NOT DEFINED>

Custom Document Properties Summary:

*FIG. 9*

5. Report Fonts (Fonts Used in this Presentation: 18) at 08:15:08 AM
Font: Times New Roman
Font: Symbol
*WARNING 1 * Picture Font: Symbol Located, User Examination Suggested
Font: Almanac MT
*WARNING 2 * Picture Font: Almanac MT Located, User Examination Suggested
Font: Holidays MT
*WARNING 3 * Picture Font: Holidays MT Located, User Examination Suggested
Font: Map Symbols
*WARNING 4 * Picture Font: Map Symbols Located, User Examination Suggested
Font: Marlett
*WARNING 5 * Picture Font: Marlett Located, User Examination Suggested
Font: Monotype Sorts
*WARNING 6 * Picture Font: Monotype Sorts Located, User Examination Suggested
Font: Monotype Sorts 2
*WARNING 7 * Picture Font: Monotype Sorts 2 Located, User Examination Suggested
Font: MS Outlook
*WARNING 8 * Picture Font: MS Outlook Located, User Examination Suggested
Font: MT Extra
*WARNING 9 * Picture Font: MT Extra Located, User Examination Suggested
Font: Vacation MT
*WARNING 10 * Picture Font: Vacation MT Located, User Examination Suggested
Font: Webdings
*WARNING 11 * Picture Font: Webdings Located, User Examination Suggested
Font: Wingdings
*WARNING 12 * Picture Font: Wingdings Located, User Examination Suggested
...  Font: ???
*WARNING 16 * Picture Font: Unknown Located, User Examination Suggested

FIG. 12

ReportPPTShapeVisibility — 1300
  For each Shape on Slide Master — 1310
    Ex Shape Visibility
  Next For each Shape on Title Master — 1320
    Ex Shape Visibility
  Next For each Shape on Notes Master — 1325
    Ex Shape Visibility
  Next For each Shape on Handout Master — 1330
    Ex Shape Visibility
  Next For each Slide — 1340
    For each Shape on Slide
      Ex Shape Visibility
    Next
    For each Shape on Notes
      Ex Shape Visibility
    Next
  Next

*FIG. 13a*

ExShapeVisibility
  If shape is Not Visible — 1350

If Text Frame — 1351
      get Text
    If Text Effect
      get Text

If Resolve In Process — 1360
      Make shape visible — 1361
      Report Resolution — 1362
      Write shape Text — 1363

Else
      Report Data Hiding — 1370
        Possibility
      Write shape Text

End if
  End If

*FIG. 13b*

6. Report Shape Visibility at 08:35:34 PM
Examining Slide Master
*WARNING 3 * Occurrence of Non-Visible Shape Located, User Examination Suggested; Slide

Master Shape: Rectangle 2
Associated text: Click to edit Master title style
Examining Notes Master
*WARNING 8 * Occurrence of Non-Visible Shape Located, User Examination Suggested; Notes

Master Shape: Rectangle 2
Associated text: <header>
Examining Handout Master
*WARNING 14 * Occurrence of Non-Visible Shape Located, User Examination Suggested;

Handout Master Shape: Rectangle 2
Associated text: <header>
Examining Slides and Notes
Examining Slide 1
*WARNING 18 * Occurrence of Non-Visible Shape Located, User Examination Suggested; Slide:

1 Shape: Rectangle 2
Associated text: picture
*WARNING 19 * Occurrence of Non-Visible Shape Located, User Examination Suggested; Slide:

1 Shape: Text Box 3
Associated text: Textbox Textbox
*WARNING 40 * Occurrence of Non-Visible Shape Located, User Examination Suggested; Notes

Page: 1 Shape: Rectangle 3
Associated text:

*FIG. 14*

ReportPPTPictureFontText —1500
   For each Shape on Slide Master —1510
     Ex Shape Picture Font
   Next For each Shape on Title Master —1520
     Ex Shape Picture Font
   Next For each Shape on Notes Master —1530
     Ex Shape Picture Font
   Next For each Shape on Handout Master —1540
     Ex Shape Picture Font
   Next For each Slide —1550
     For each Shape on Slide
       Ex Shape Picture Font
     Next
     For each Shape on Notes
       Ex Shape Picture Font
     Next
   Next

*FIG. 15a*

ExShapePictureFont ─╱─1560
| Case of Shape Type
|   Auto Shape            Examine Text Frame
|   Call Out              Examine Text Frame
|   Chart                 Missing Warning
|   Comment               Examine Text Frame
|   Embedded OLE Object   OLE Warning
|   Form Control          Missing Warning
|   Free Form             Ignore
|   Group                 Per each Group Shape
|   Line                  Ignore
|   Linked OLE Object     OLE Warning
|   Linked Picture        Missing Warning
|   Media                 Ignore
|   OLE Control Object    Missing Warning
|   Picture               Ignore
|   Place Holder          Examine Text Frame
|   Script Anchor         Missing Warning
|   Shape Type Mixed      Missing Warning
|   Table                 Per each Table Cell
|   Text Box              Examine Text Frame
|   Text Effect           Examine Text Effect
|   Unknown               Unknown Warning
| End Case
▼

*FIG. 15b*

ExTextFramePictureFont ─╱─1570
| For each Picture Font
|   If Text Font is
|     Picture Font
|       Report Data hiding
|         Possibility
▼

ExTextEffectPictureFont ─╱─1580
| For each Picture Font
|   If Text Effect Font is
|     Picture Font
|       Report Data hiding
|         Possibility
▼

*FIG. 15c*

ReportPPTFontSize — 1700
   For each Shape on Slide Master — 1710
     Ex Shape Font Size
   Next For each Shape on Title Master — 1720
     Ex Shape Font Size
   Next For each Shape on Notes Master — 1730
     Ex Shape Font Size
   Next For each Shape on Handout Master — 1740
     Ex Shape Font Size
   Next For each Slide — 1750
     For each Shape on Slide
       Ex Shape Font Size
     Next
     For each Shape on Notes
       Ex Shape Font Size
     Next
   Next

*FIG. 17a*

ExShapeFontSize —1760

Case of Shape Type
  Auto Shape              Examine Font Size
  Call Out                Examine Font Size
  Chart                   Missing Warning
  Comment              Examine Font Size
  Embedded OLE Object  OLE Warning
  Form Control          Missing Warning
  Free Form             Ignore
  Group                   Per each Group Shape
  Line                    Ignore
  Linked OLE Object     OLE Warning
  Linked Picture        Missing Warning
  Media                 Ignore
  OLE Control Object    Missing Warning
  Picture               Ignore
  Place Holder          Examine Font Size
  Script Anchor         Missing Warning
  Shape Type Mixed     Missing Warning
  Table                 Per each Table Cell
  Text Box              Examine Font Size
  Text Effect           Examine Font Size
  Unknown             Unknown Warning
End Case

*FIG. 17b*

8. Report Font Size for Very Small (less than 5 points) or Very Large (greater than 100 points) Fonts at 08:25:02 AM
Examining Slide Master
*WARNING 3 * Text with Font Size of: 4 Located, User Examination Suggested; Slide Master Shape: Text Box 7
Text is as Follows: Small font: Large font (on master)
Examining Title Master
*WARNING 4 * Text with Mixed Font Sizes, Greater than the Threshold Located, User Examination Suggested; Title Master Shape: Text Box 1031
Text is as Follows: Small font: Large font (on title master)
Examining Slide 3
*WARNING 7 * Text with Font Size of: 101 Located, User Examination Suggested;
Slide: 3 Shape: Rectangle 2050
Text is as Follows: Large font on all of title

FIG. 18

ReportPPTShapeSize —1900
  For each Shape on Slide Master —1910
    Ex Shape Size
  Next For each Shape on Title Master —1920
    Ex Shape Size
  Next For each Shape on Notes Master —1930
    Ex Shape Size
  Next For each Shape on Handout Master —1940
    Ex Shape Size
  Next For each Slide —1950
    For each Shape on Slide
      Ex Shape Size
    Next
    For each Shape on Notes
      Ex Shape Size
    Next
  Next

*FIG. 19a*

ExShapeSize —1960
- Case of Shape Type
  - Auto Shape — Examine Width
  - Call Out — Examine Width
  - Chart — Examine Height and Width
  - Comment — Examine Width
  - Embedded OLE Object — Examine Height and Width
  - Form Control — Examine Height and Width
  - Free Form — Ignore
  - Group — Per each Group Shape
  - Line — Ignore
  - Linked OLE Object — Examine Height and Width
  - Linked Picture — Examine Height and Width
  - Media — Examine Height and Width
  - OLE Control Object — Examine Height and Width
  - Picture — Examine Height and Width
  - Place Holder — Examine Width
  - Script Anchor — Examine Height and Width
  - Shape Type Mixed — Missing Warning
  - Table — Per each Table Cell
  - Text Box — Examine Width
  - Text Effect — Examine Height and Width
  - Unknown — Unknown Warning
- End Case

*FIG. 19b*

EXShapeWidth —1970
- If Shape Width
  - is less than .25
  - Report Data Hiding
    - Possibility
- End If ExShapeHeightAndWidth —1980
- If Shape Width
  - is less user setting or
  - is greater user setting
  - Report Data Hiding
    - Possibility
- End If

- If Shape Height
  - is less user setting or
  - is greater user setting
  - Report Data Hiding
    - Possibility
- End If

*FIG. 19c*

9. Report Shape Size for Very Small (less than 18 points (0.25in)) or Very Large (greater than 1000 points (13.89in)) Shapes at 08:33:36 AM
Examining Slide Master
Examining Notes Master ...
Examining Slide 5
*WARNING 7 * Comment Shape Width of: 6(0.08in) Located, User Examination Suggested; Slide: 5 Shape: Comment 3
    Comment Text: Greg Smith: This is a comment
Examining Slide 6
*WARNING 8 * Place Holder Shape Width of: 12(0.17in) Located, User Examination Suggested; Slide: 6 Shape: Rectangle 2
    Place Holder Text: Place Holder ...
Examining Slide 20
*WARNING 9 * Text Box Shape Width of: 13.875(0.19in) Located, User Examination Suggested; Slide: 20 Shape: Text Box 3
    Text Box Text: Simple Text Box
Examining Slide 21
*WARNING 10 * Shape Height of: 6(0.08in) Located, User Examination Suggested; Slide: 21 Shape: WordArt 3
    Text is as Follows: Your Text Here

*FIG. 20*

ReportPPTAlternativeText —2100
  For each Shape on Slide Master —2110
    Ex Shape Alternative Text
  Next For each Shape on Title Master —2120
    Ex Shape Alternative Text
  Next For each Shape on Notes Master —2130
    Ex Shape Alternative Text
  Next For each Shape on Handout Master —2140
    Ex Shape Alternative Text
  Next For each Slide —2150
    For each Shape on Slide
      Ex Shape Alternative Text
    Next
    For each Shape on Notes
      Ex Shape Alternative Text
    Next
  Next

*FIG. 21a*

ExShapeAlternativeText — 2160
- Case of Shape Type
  - Auto Shape    Examine Alternative Text
  - Call Out    Examine Alternative Text
  - Chart    Examine Alternative Text
  - Comment    Examine Alternative Text
  - Embedded OLE Object    Examine Alternative Text
  - Form Control    Examine Alternative Text
  - Free Form    Examine Alternative Text
  - Group    Per each Group Shape
  - Line    Examine Alternative Text
  - Linked OLE Object    Examine Alternative Text
  - Linked Picture    Examine Alternative Text
  - Media    Examine Alternative Text
  - OLE Control Object    Examine Alternative Text
  - Picture    Examine Alternative Text
  - Place Holder    Examine Alternative Text
  - Script Anchor    Examine Alternative Text
  - Shape Type Mixed    Examine Alternative Text
  - Table    Per each Table Cell
  - Text Box    Examine Alternative Text
  - Text Effect    Examine Alternative Text Effect
  - Unknown    Unknown Warning
- End Case

*FIG. 21b*

ExTextFrameAlternativeText — 2170
- If Text exists
  - If Text not equal to Alternative text
    - Report Data Hiding Possibility
- Else
  - If Alternative text exists
    - Report Data Hiding Possibility
- End if ExTextEffectAlternativeText — 2180
- If Effect Text exists
  - If Effect Text not equal to Alternative text
    - Report Data Hiding Possibility
- Else
  - If Alternative text exists
    - Report Data Hiding Possibility
- End if

*FIG. 21c*

10. Report Alternative Text at 03:59:19 PM
Examining Slide Master
*WARNING 5 * Mismatch of Displayed and Alternative Text Located, User Examination
Suggested: Slide Master Shape: Text Box 7
Displayed Text is as Follows (8): Text Box
Alternative Text is as Follows (38): This is alternative text on a text box
Examining Title Master
*WARNING 6 * Mismatch of Displayed and Alternative Text Located, User Examination
Suggested: Title Master Shape: Text Box 7
Displayed Text is as Follows (8): Text Box
Alternative Text is as Follows (38): This is alternative text on a text box
Examining Notes Master
*WARNING 7 * Mismatch of Displayed and Alternative Text Located, User Examination
Suggested: Notes Master Shape: Text Box 8
Displayed Text is as Follows (8): Text Box
Alternative Text is as Follows (38): This is alternative text on a text box
Examining Handout Master
*WARNING 8 * Mismatch of Displayed and Alternative Text Located, User Examination
Suggested: Notes Master Shape: Text Box 6
Displayed Text is as Follows (8): Text Box
Alternative Text is as Follows (38): This is alternative text on a text box
Examining Slide 1
Examining Slide 2
*WARNING 9 * Mismatch of Displayed and Alternative Text Located, User Examination
Suggested: Slide: 2 Shape: Rectangle 1026
Displayed Text is as Follows (25): Alternative text on title
Alternative Text is as Follows (53): This is alternative text on title shape (placeholder)

FIG. 22

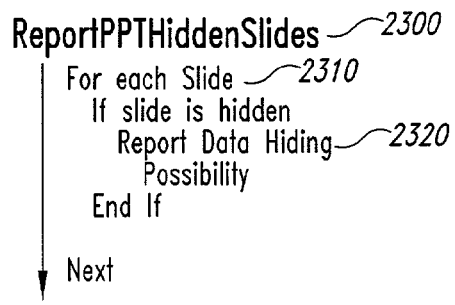

```
ReportPPTHiddenSlides ⟋2300
  For each Slide ⟋2310
    If slide is hidden
      Report Data Hiding ⟋2320
        Possibility
    End If
  Next
```

FIG. 23

```
11. Report Hidden Slides (Slides Used in this Presentation: 16) at 04:14:22 PM
Examining Slide 1
Examining Slide 2
Examining Slide 3   ⟋2410
***WARNING 27 *** Hidden Slide Located, User Examination Suggested; Slide: 3
Examining Slide 4
Examining Slide 5
Examining Slide 6
Examining Slide 7
Examining Slide 8
Examining Slide 9
Examining Slide 10
Examining Slide 11
Examining Slide 12
Examining Slide 13
Examining Slide 14
Examining Slide 15
Examining Slide 16
  Slide Summary, 1 Hidden Slide(s) Found
```

FIG. 24    2400

ReportPPTHyperLinks —2500
   For each Hyperlink on Slide Master—2510
     Report Data Hiding Possibility—2520
   Next For each Hyperlink on Title Master—2530
     Report Data Hiding Possibility—2540
   Next For each Slide —2550
     Report Data Hiding Possibility—2560
   Next

12. Report Hyperlinks (Hyperlinks Used in this Presentation) at 04:14:22 PM
Examining Slide Master
Examining Title Master
Examining Slide 1    —2610
\*\*\* WARNING 28 \*\*\* 1 Hyperlink(s) Located, User Examination Suggested; Slide: 1
 Address: http://www.boeing.com/
 Email Subject:
 Screen Tip:
 Sub Address:
 Type: HyperlinkRange
Text to Display: http://www.boeing.com/
Examining Slide 2
Examining Slide 3
Examining Slide 4
Examining Slide 5
Examining Slide 6
Examining Slide 7
Examining Slide 8
Examining Slide 9
Examining Slide 10
Examining Slide 11
Examining Slide 12
Examining Slide 13
Examining Slide 14
  Hyperlink Summary, 1 Hyperlink(s) Found

ReportPPTObjects — 2700
  For each Shape on Slide Master — 2710
    Ex Shape Objects
  Next For each Shape on Title Master — 2720
    Ex Shape Objects
  Next For each Shape on Notes Master — 2730
    Ex Shape Objects
  Next For each Shape on Handout Master — 2740
    Ex Shape Objects
  Next For each Slide — 2750
    For each Shape on Slide
      Ex Shape Objects
    Next
    For each Shape on Notes
      Ex Shape Objects
    Next
  Next

*FIG. 27a*

ExShapeObject ⎯2760

Case of Shape Type
| | |
|---|---|
| Auto Shape | Ignore |
| Call Out | Ignore |
| Chart | Ignore (need to look at) |
| Comment | Ignore |
| Embedded OLE Object | Report Data Hiding Possibility |
| Form Control | Ignore |
| Free Form | Ignore |
| Group | Per each Group Shape |
| Line | Ignore |
| Linked OLE Object | Report Data Hiding Possibility |
| Linked Picture | Report Data Hiding Possibility |
| Media | Ignore |
| OLE Control Object | Report Data Hiding Possibility |
| Picture | Ignore |
| Place Holder | Ignore |
| Script Anchor | Ignore |
| Shape Type Mixed | Ignore |
| Table | Per each Table Cell |
| Text Box | Ignore |
| Text Effect | Ignore |
| Unknown | Ignore |

End Case

```
13. Report Objects (Association with Data in other Applications) at 04:14:23 PM
Examining Slide Master
Examining Title Master
Examining Notes Master
Examining Handout Master
Examining Slide 1
*** WARNING 29 *** OLE source: Excel.Chart.8 Located, User Examination Suggested;
Slide: 1 Shape: Object 3
*** WARNING 30 *** OLE source: Excel.Chart.8 Located, User Examination Suggested;
Notes Page: 1 Shape: Object 4
Examining Slide 2
Examining Slide 3
Examining Slide 4
*** WARNING 31 *** Link source: C:\Documents and Settings\smithg\Desktop\data
hiding\PP_test.xls Located, User Examination Suggested; Slide: 4 Shape: Object 3
Examining Slide 5
*** WARNING 32 *** OLE source: Word.Document.8 Located, User Examination
Suggested; Slide:5 Shape: Object 3
Examining Slide 6
Examining Slide 7
Examining Slide 8
...
Examining Slide 15
Examining Slide 16
Object Summary: 3 OLE Objects(s) Found, 1 Link Object(s) Found
```

2810

2800

ReportPPTTextFillColorMatch —2900
  For each Shape on Slide Master —2910
    Ex Shape Text Fill Color Match
  Next For each Shape on Title Master —2920
    Ex Shape Text Fill Color Match
  Next For each Shape on Notes Master —2930
    Ex Shape Text Fill Color Match
  Next For each Shape on Handout Master —2940
    Ex Shape Text Fill Color Match
  Next For each Slide
    For each Shape on Slide —2950
      Ex Shape Text Fill Color Match
    Next
    For each Shape on Notes
      Ex Shape Text Fill Color Match
    Next
  Next

*FIG. 29a*

ExShapeTextFillColorMatch
- If Has Text Frame —2960
  - Determine background color
  - Determine font color
  - Determine fill color

- If fill is transparent
    - If font exactly matches background
      - Report Data Hiding possibility —2961

- If font nearly matches background
      - Report Data Hiding possibility —2962

- Else
    - If font exactly matches fill
      - Report Data Hiding possibility —2963

- If font nearly matches fill
      - Report Data Hiding possibility —2964

- End If

- End If

*FIG. 29b*

14. Report Text/Fill/Background Color Matches at 04:22:36 PM
Checking Text Fill Color Matching Template, Not Presently Implemented
Examining Slide Master
Examining Title Master
Examining Notes Master
Examining Handout Master
Examining Slide 1
Examining Slide 2
* WARNING 33 * Match of Text (scheme) color and Fill (scheme) color Located, User
Examination Suggested; Slide: 2 Shape: Text Box 3
  Associated Text: Text Color Auto and Same As Fill
* WARNING 34 * Match of Text (scheme) color and Fill (scheme) color Located, User
Examination Suggested; Slide: 2 Shape: Text Box 4
  Associated Text: Text Color Auto and Same As Fill
* WARNING 35 * Match of Text color and Background color Located, User
Examination Suggested; Slide: 2 Shape: Text Box 5
  Associated Text: This is a test
Examining Slide 3
Examining Slide 4
Examining Slide 5
Examining Slide 6
Examining Slide 7
Examining Slide 8

FIG. 30

ExamineOverlappingShapes — 3162

If shape2.Left >= shape1.Left And
  (shape1.Left + shape1.width) >=
  (shape2.Left + fuzzyoverlap) Then xoverlap = True
If shape1.Left >= shape2.Left And
  (shape2.Left + shape2.width) >=
  (shape1.Left + fuzzyoverlap) Then xoverlap = True
If xoverlap Then If shape2.Top >= shape1.top And
    (shape1.Top + shape1.height) >=
    (shape2.Top + fuzzyoverlap) Then yoverlap = True
  If shape1.Top >= shape2.Top And
    (shape2.Top + shape2.height) >=
    (shape1.Top + fuzzyoverlap) Then yoverlap = True
  If yoverlap Then If shape1 is in front of shape2
      If shape1 has a fill
        Report Data Hiding Possibility If shape2 is in front of shape1
      If shape2 has a fill
        Report Data Hiding Possibility

*FIG. 31c*

15. Report Overlapping Shapes (allowable overlap set to: 18 points (0.25in)) at 04:22:52 PM
...
Examining Slide 3
*WARNING 36 * Overlapping Shapes(F3, B2) Located, User Examination Suggested: Slide: 3 Shape: Text Box 4
Text on Covered Shape: This is hidden text
Text on Top Shape:
...
Examining Slide 12
*WARNING 37 * Overlapping Shapes(F2, B1) Located, User Examination Suggested: Slide: 12 Shape: Rectangle 2
Text on Covered Shape: Slide with comment
Text on Top Shape: Greg Smith:

FIG. 32

ReportPPTOffSlideShapes — 3300

For each Shape on Slide Master
    Ex Off Slide Shapes — 3310
  Next

For each Shape on Title Master
    Ex Off Slide Shapes — 3320
  Next

For each Shape on Notes Master
    Ex Off Slide Shapes — 3330
  Next

For each Shape on Handout Master
    Ex Off Slide Shapes — 3340
  Next

For each Slide — 3350
    For each Shape on Slide
      Ex Off Slide Shapes
    Next
    For each Shape on Notes
      Ex Off Slide Shapes
    Next
  Next

*FIG. 33a*

ExOffSlideShapes — 3360

Determine form height
  Determine form width

If Shape left < 0 (off to left)
    Report Data Hiding Possibility

If Shape top < 0 (off to top)
    Report Data Hiding Possibility

If Shape left + width > form width (off to right)
    Report Data Hiding Possibility If Shape top + height > form height (off to bottom)
    Report Data Hiding Possibility

*FIG. 33b*

16. Report Off Slide Shapes at 04:40:32 PM
Slide Master Height: 540(7.5in), Width: 720(10in)
Examining Slide Master
*WARNING 38 * Shape off to the Left Located, User Examination

Suggested: Slide Master Shape: Picture 4

Associated Text:
Title Master Height: 540(7.5in), Width: 720(10in)
Examining Title Master
Notes Master Height: 540(7.5in), Width: 720(10in)
Examining Notes Master
Handout Master Height: 540(7.5in), Width: 720(10in)
Examining Handout Master
Presentation Height: 540(7.5in), Width: 720(10in)
Notes Page Height: 540(7.5in), Width: 720(10in)
Examining Slide 1
*WARNING 39* Shape off to the Left Located, User Examination

Suggested: Notes Page: 1 Shape: Text Box 5

Associated Text: On left of notes page

*FIG. 34*

ReportPPTOffslideText —3500
  For each Shape on Slide Master
    Ex Off Slide Text —3510
  Next For each Shape on Title Master
    Ex Off Slide Text —3520
  Next For each Shape on Notes Master
    Ex Off Slide Text —3530
  Next For each Shape on Handout Master
    Ex Off Slide Text —3540
  Next For each Slide —3550
    For each Shape on Slide
      Ex Off Slide Text
    Next
    For each Shape on Notes
      Ex Off Slide Text
    Next
  Next

*FIG. 35a*

ExOffSlideText —3560
  Determine form height
  Determine form width

If Shape text left < 0 (off to left)
    Report Data Hiding Possibility

If Shape text top < 0 (off to top)
    Report Data Hiding Possibility

If Shape text left + width > form width (off to right)
    Report Data Hiding Possibility If Shape text top + height > form height (off to bottom)
    Report Data Hiding Possibility

17. Report Off Slide Text at 04:44:32 PM
Slide Master Height: 540(7.5in), Width: 720(10in)
Examining Slide Master
Title Master Height: 540(7.5in), Width: 720(10in)
Examining Title Master
Notes Master Height: 540(7.5in), Width: 720(10in)
Examining Notes Master
Handout Master Height: 720(10in), Width: 540(7.5in)
Examining Handout Master
Presentation Height: 540(7.5in), Width: 720(10in)
Notes Page Height: 720(10in), Width: 540(7.5in)
Examining Slide 1
* WARNING 3 * Shape off to the Right (due to Left Margin Offset) Located, User Examination
Suggested; Slide: 1 Shape: Text Box 1026
    Associated Text: Extreme Internal Left Margin Slide
* WARNING 4 * Shape off to the Bottom (due to Top Margin Offsite) Located, User Examination
Suggested; Slide: 1 Shape: Text Box 1027
    Associated Text: Extreme Internal Top Margin Slide
Examining Slide 2
Examining Slide 3                                                  —3610
* WARNING 5 * Shape off to the Right (due to Left Margin Offset) Located, User Examination
Suggested; Slide: 3 Shape: Text Box 2
    Associated Text: Extreme Internal Left Margin Slide
* WARNING 6 * Shape off to the Bottom (due to Top Margin Offsite) Located, User Examination
Suggested; Slide: 3 Shape: Text Box 3
    Associated Text: Extreme Internal Top Margin Slide
Examining Slide 4
Examining Slide 5

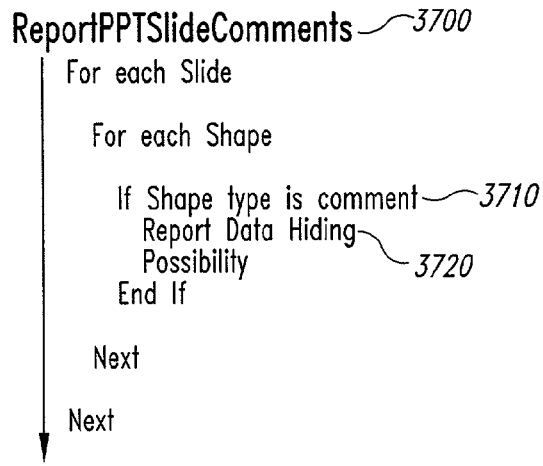

FIG. 37

```
18. Report Slide Comments at 04:40:46 PM
Examining Slide 1
Examining Slide 2
Examining Slide 3
Examining Slide 4
Examining Slide 5
Examining Slide 6
Examining Slide 7
Examining Slide 8
Examining Slide 9
Examining Slide 10
Examining Slide 11                          ─3810
Examining Slide 12                        /
*** WARNING 47 *** Comment Text Located, User Examination Suggested; Slide: 12 Shape:
Comment 3
  Comment Text: Greg Smith:
This is a comment
Examining Slide 13
Examining Slide 14
Examining Slide 15
```
                                                    3800

FIG. 38

ReportPPTSlideNotes — 3900
　For each Slide
　　For each Shape
　　　If Shape type is not placeholder — 3910
　　　　Report Data Hiding Possibility
　　　End If
　　Next
　Next

*FIG. 39*

19. Report Slide Notes at 04:40:47 PM
Examining Slide 1
* WARNING 48 * Shape Located, User Examination Suggested; Notes Page: 1 Shape: Object 4
* WARNING 49 * Shape Located, User Examination Suggested; Notes Page: 1 Shape: Text Box 5
  Associated Text: On left of notes page
* WARNING 50 * Shape Located, User Examination Suggested; Notes Page: 1 Shape: Text Box 6
  Associated Text: On right of notes page
* WARNING 51 * Shape Located, User Examination Suggested; Notes Page: 1 Shape: Text Box 7
  Associated Text: On top of notes page
* WARNING 52 * Shape Located, User Examination Suggested; Notes Page: 1 Shape: Text Box 8
  Associated Text: On bottom of notes page
* WARNING 53 * Shape Located, User Examination Suggested; Notes Page: 1 Shape: Text Box 9
  Associated Text: http://www.boeing.com/
Examining Slide 2
Examining Slide 3
...
Examining Slide 10
Examining Slide 11
Examining Slide 12
Examining Slide 13
* WARNING 54 * Text Shape Located, User Examination Suggested; Notes Page: 13 Shape: Rectangle 3
  Associated Text: Here is a note on a note page where the slide has been remove.
Examining Slide 14
* WARNING 55 * Text Shape Located, User Examination Suggested; Notes Page: 14 Shape: Rectangle 3
  Associated Text: Some slide notes on slide 14
Examining Slide 15
* WARNING 56 * Text Shape Located, User Examination Suggested; Notes Page: 15 Shape: Rectangle 6
  Associated Text: Notes page with an added text object

*FIG. 40*

ReportPPTSlideScripts —— 4100
  For each Script on Slide Master
      Report Data Hiding Possibility —— 4110
  Next For each Script on Title Master
      Report Data Hiding Possibility —— 4120
  Next For each Slide
    For each Script on Slide
        Report Data Hiding Possibility —— 4130
    Next
  Next

20. Report Slide Scripts at 10:58:11PM
Examining Slide Master
Examining Notes Master - Not Supported by PowerPoint
Examining Handout Master - Not Supported by PowerPoint
Examining Slides, Notes - Not Supported by PowerPoint
Examining Slide 1
4150 —— *WARNING 2 * 1 Script(s) Located, User Examination
Suggested; Slide: 1
in ShowScript
   Creator: 1347899476
   Extended:
   ID:
   Language: msoScriptLanguageVisualBasic
   Location: msoScriptLocationInBody
   Script Text: <!--

-->
   Script Summary, 1 Script(s) Found

ReportPPTSlideMedia ⎯⎯ 4200
- For each Shape on Slide Master
   Ex Slide Media ⎯⎯ 4210
  Next For each Shape on Title Master
   Ex Slide Media ⎯⎯ 4220
  Next For each Shape on Notes Master
   Ex Slide Media ⎯⎯ 4230
  Next For each Shape on Handout Master
   Ex Slide Media ⎯⎯ 4240
  Next For each Slide ⎯⎯ 4250
   For each Shape on Slide
     Ex Slide Media
   Next
   For each Shape on Notes
     Ex Slide Media
   Next
  Next

*FIG. 42a*

ExSlideMedia ⎯⎯ 4260
- If Shape type is msoMedia
   Report Data Hiding Possibility Select case of Animation
   Sound Effect
     Report Data Hiding Possibility Sound File
     Report Data Hiding Possibility Select case of Action Settings
   Sound Effect Mixed
     Report Data Hiding Possibility Sound File
     Report Data Hiding Possibility

*FIG. 42b*

```
21. Report Slide Media at 04:40:52 PM
Examining Slide Master
Examining Title Master
Examining Notes Master
Examining Handout Master
Examining Slide 1
*** WARNING 61 *** Left Mouse Click Action Sound on Text Frame, File: applause.wav
Located, User Examination Suggested; Slide: 1 Shape: Rectangle 2
   Associated Text: Excel OLE inserted object
*** WARNING 62 *** Mouse Over Action Sound on Shape, File: chimes.wav Located,
User Examination Suggested; Slide: 1 Shape: Object 3
   Associated Text:
Examining Slide 2
Examining Slide 3
Examining Slide 4
Examining Slide 5
Examining Slide 6
Examining Slide 7
Examining Slide 8
Examining Slide 9
...
Examining Slide 15
*** WARNING 63 *** Left Mouse Click Action Sound on Characters, File: applause.wav
Located, User Examination Suggested; Slide: 15 Shape: Text Box 3
   Associated Text: Mixed small and large fonts
*** WARNING 64 *** Mouse Over Action Sound on Characters, File: cashreg.wav
Located, User Examination Suggested; Slide: 15 Shape: Text Box 3
   Associated Text: Mixed small and large fonts
Examining Slide 16
```

FIG. 43

22. Report Slide Pictures (crop greater than 0.5 in or scale less than 50 percent) at 04:41:07 PM
Examining Slide Master
Examining Title Master
* WARNING 65 * Significant Picture Left Crop (0.61in) Located, User Examination Suggested; Title Master Shape: Picture 3
Examining Notes Master
Examining Handout Master
Examining Slide 1
Examining Slide 2
Examining Slide 3
Examining Slide 4

...
Examining Slide 12
Examining Slide 13
Examining Slide 14
Examining Slide 15
Examining Slide 16
* WARNING 66 * Significant Picture Top Crop (1.2in) Located, User Examination Suggested; Slide: 16 Shape: Picture 3
* WARNING 67 * Significant Picture Bottom Crop (2.8in) Located, User Examination Suggested; Slide: 16 Shape: Picture 3
* WARNING 68 * Significant Picture Right Crop (1.1in) Located, User Examination Suggested; Slide: 16 Shape: Picture 3
* WARNING 69 * Significant Picture Top Crop (1.2in) Located, User Examination Suggested; Slide: 16 Shape: Picture 4
* WARNING 70 * Significant Picture Bottom Crop (2.8in) Located, User Examination Suggested; Slide: 16 Shape: Picture 4
* WARNING 71 * Significant Picture Right Crop (1.1in) Located, User Examination Suggested; Slide: 16 Shape: Picture 4
* WARNING 72 * Significant Picture Scale (1.73%) Reduction Located, User Examination Suggested; Slide: 16 Shape: Picture 4

ReportPPTSearchPhrases —4600
   For each Shape on Slide Master
     Ex Text —4610

For each Shape on Title Master
     Ex Text —4620

For each Shape on Notes Master
     Ex Text —4630

For each Shape on Handout Master
     Ex Text —4640
   Next

For each Slide —4650
     For each Shape on Slide
       Ex Text
     Next
     For each Shape on Notes
       Ex Text
     Next
   Next

*FIG. 46a*

ExSlidePhrases —4660
   For each user defined search phrase

If shape text contains phrase
       Report Data Hiding Possibility

End If

*FIG. 46b*

```
23. Report Occurrences of (5) Specified Phases at 05:13:32 PM
Examining Slide Master
Examining Title Master
Examining Notes Master
Examining Handout Master
Examining Slide 1
*** WARNING 9 *** Occurrence of Specified Phrase (classified) Located, User Examination
Suggested; Slide: 1 Shape: Text Box 8
Examining Slide 2     /-4710
*** WARNING 10 *** Occurence of Specified Phrase (limited) Located, User Examination
Suggested; Slide: 2 Shape: Text Box 3
```
                                                                    4700

*FIG. 47*

ReportPPTMacros —4800
  For each Shape on Slide Master
    Ex for Macro—4810
  Next For each Shape on Title Master
    Ex for Macro—4820
  Next For each Slide
    For each Shape on Slide
      Ex for Macro—4830
    Next
    For each Shape on Notes
      Ex for Macro—4840
    Next
  Next

*FIG. 48a*

ExSlideMacros —4840
| For each Action Setting
|
|   If action is Run Macro
|     Report Data Hiding Possibility
|
| End If
▼

*FIG. 48b*

ResolveHiddenData —4900
| If ResolveInProcess then —4910
|   Select Case ResolveType —4920
4930—|    Case Remove
|       If RequestConfirmation then
|         If UserConfirm then RemoveIncident
|       Else
|         RemoveIncident
|       End If
|     Case Add to new slide
|       If RequestConfirmation then
|         If UserConfirm then AddtoNewSlide
|       Else
|         AddtoNewSlide
|       End If
|     Case Add to Backup slide
|       If RequestConfirmation then
|         If UserConfirm then AddtoBackupSlide
|       Else
|         AddtoBackupSlide
|       End If
▼     <continued on next slide>

*FIG. 49a*

4. Report Property Information (Property text greater than 25 characters) at 10:45:05 PM
Builtin Document Properties:
Occurence of Property Value Located and Removed
  Property: Title Value:
  Property: Subject Value: Subject
Occurence of Property Value Located and Removed
  Property: Hyperlink base Value:
Custom Document Properties:
  Property: test Value: this is a test tag
...

5. Report Fonts (Fonts Used in this Presentation: 7) at 10:45:06 PM
Font: Wingdings
* WARNING 1 * Picture Font: Wingdings Located, User Examination Suggested Font: Algerian
...

6. Report Shape Visibility at 10:45:06 PM
Examining Slide Master
Examining Notes Master
Examining Slide 6
Examining Slide 7
Occurrence of Non-Visible Shape Located and Removed
  Associated text: Non Visible shapes
Occurrence of Non-Visible Shape Located and Removed
  Associated text:
Occurrence of Non-Visible Shape Located and Removed
  Associated text: Your Text Here
...

*FIG. 50*

SYSTEM AND METHOD FOR IDENTIFYING, CLASSIFYING, EXTRACTING AND RESOLVING HIDDEN ENTITIES

BACKGROUND OF THE INVENTION

The present invention generally relates to software applications and, more particularly, to a software application for identifying, classifying, and extracting hidden or embedded entities in a data file.

As is well known in the art, it is possible to hide or embed data in documents of various types. For example, U.S. Pat. No. 5,822,436 discloses a machine-readable marking provided on emulsion films, photographic papers, and the like. The marking encodes digital information, yet is essentially imperceptible to the human eye. Additionally, U.S. Pat. No. 6,289,108 discloses providing a photograph with supplemental data. This supplemental data is below a threshold of human perception (e.g., is essentially invisible) yet can extend throughout the image.

Furthermore, during the preparation of data files, data may be hidden in such files, whether deliberately or inadvertently. Hidden data includes data within an application or an application data file that may not be visible by normal viewing of the data within the application. For example, during the preparation of a PowerPoint® presentation, text may be included in a slide where the color of the font matches the fill color of the text box.

Such hidden data raises security concerns should the data file reach an audience other than an intended audience. This is particularly so in the case of proprietary or classified information hidden in data files.

As can be seen, there is a need for a system and method for identifying, classifying, and extracting hidden information from data files. Such a system and method preferably includes a means for resolving hidden information issues identified.

SUMMARY OF THE INVENTION

In one aspect of the present invention, a method for identifying, classifying, extracting, and resolving hidden entities from a data file includes searching for an executing copy of an application associated with the data file; initiating the application in a background if the application is not running; opening the data file for reading only, examining the data file for hidden entities; and generating an examination log of incidents of hidden entities. The method may include resolving the incidents of hidden entities.

In another aspect of the present invention, a method for identifying, classifying extracting and resolving hidden entities from a data file includes searching for an executing copy of an application associated with the data file, initiating the application in a background if the application is not running, opening the data file for reading only, examining the data file for hidden entities including non visible shapes, picture font text, alternative text, hidden slides, hyperlinks, objects, text font, color and size, background color matches, overlapping shapes, off slide shapes, off slide text, slide comments, slide notes, slide scripts, slide media, slide pictures, and macros, and generating an examination log of incidents of hidden entities. The method may include resolving the incidents of hidden entities.

In yet another aspect of the present invention, a system for identifying, classifying, extracting hidden entities from a data file includes a memory coupled to a processor, the processor operable to search for an executing copy of an application associated with the data file, initiate the application in a background if the application is not running, open the data file for reading only, examine the data file for hidden entities, generate an examination log of incidents of hidden entities. The processor may be operable to resolve the incidents of hidden entities.

In a further aspect of the present invention, a computer readable media for identifying, classifying, extracting and resolving hidden entities from a data file includes a code segment for searching for an executing copy of an application associated with the data file, a code segment for initiating the application in a background if the application is not running, a code segment for opening the data file for reading only, a code segment for examining the data file for hidden entities, and a code segment for generating an examination log of incidents of hidden entities. The computer readable media may include a code segment for resolving the incidents of hidden entities.

These and other features, aspects and advantages of the present invention will become better understood with reference to the following drawings, description and claims.

BRIEF DESCRIPTION OF THE DRAWINGS

FIG. 4 is a pseudocode listing illustrating a routine in accordance with the invention;

FIG. 8 is a pseudocode listing illustrating a routine in accordance with the invention;

FIG. 9 is a screen shot of an examination log in accordance with the invention;

FIG. 12 is a screen shot of an examination log in accordance with the invention;

FIGS. 13a and 13b are a pseudocode listing illustrating a routine in accordance with the invention;

FIG. 14 is a screen shot of an examination log in accordance with the invention;

FIGS. 15a, 15b, and 15c are a pseudocode listing illustrating a routine in accordance with the invention;

FIGS. 17a, 17b, and 17c are a pseudocode listing illustrating a routine in accordance with the invention;

FIG. 18 is a screen shot of an examination log in accordance with the invention;

FIGS. 19a, 19b, and 19c are a pseudocode listing illustrating a routine in accordance with the invention;

FIG. 20 is a screen shot of an examination log in accordance with the invention;

FIGS. 21a, 21b, and 21c are a pseudocode listing illustrating a routine in accordance with the invention;

FIG. 22 is a screen shot of an examination log in accordance with the invention;

FIG. 23 is a pseudocode listing illustrating a routine in accordance with the invention;

FIG. 24 is a screen shot of an examination log in accordance with the invention;

FIG. 25 is a pseudocode listing illustrating a routine in accordance with the invention;

FIG. 26 is a screen shot of an examination log in accordance with the invention;

FIGS. 27a and 27b are a pseudocode listing illustrating a routine in accordance with the invention;

FIG. 28 is a screen shot of an examination log in accordance with the invention;

FIGS. 29a and 29b are a pseudocode listing illustrating a routine in accordance with the invention;

FIG. 30 is a screen shot of an examination log in accordance with the invention;

FIGS. 31a, 31b, and 31c are a pseudocode listing illustrating a routine in accordance with the invention;

FIG. 32 is a screen shot of an examination log in accordance with the invention;

FIGS. 33a and 33b are a pseudocode listing illustrating a routine in accordance with the invention;

FIG. 34 is a screen shot of an examination log in accordance with the invention;

FIGS. 35a and 35b are a pseudocode listing illustrating a routine in accordance with the invention;

FIG. 36 is a screen shot of an examination log in accordance with the invention;

FIG. 37 is a pseudocode listing illustrating a routine in accordance with the invention;

FIG. 38 is a screen shot of an examination log in accordance with the invention;

FIG. 39 is a pseudocode listing illustrating a routine in accordance with the invention;

FIG. 40 is a screen shot of an examination log in accordance with the invention;

FIG. 41 is a pseudocode listing illustrating a routine in accordance with the invention;

FIG. 41a is a screen shot of an examination log in accordance with the invention;

FIGS. 42a and 42b are a pseudocode listing illustrating a routine in accordance with the invention;

FIG. 43 is a screen shot of an examination log in accordance with the invention;

FIG. 45 is a screen shot of an examination log in accordance with the invention;

FIGS. 46a and 46b are a pseudocode listing illustrating a routine in accordance with the invention;

FIG. 47 is a screen shot of an examination log in accordance with the invention;

FIGS. 48a and 48b are a pseudocode listing illustrating a routine in accordance with the invention FIGS. 49a and 49b are a pseudocode listing illustrating a routine in accordance with the invention;

FIG. 50 is a screen shot of a report in accordance with the invention; and

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a method for identifying, classifying and extracting hidden entities from a data file. The method includes searching for an executing copy of an application associated with the data file, initiating the application in a background if the application is not running, opening the data file for reading only, examining the data file for hidden entities, generating an examination log of incidents of hidden entities, and optionally, resolving the identified incidents. In contrast to the prior art, the present invention does not provide for hidden or embedded data but rather provides a means by which such data may be identified, classified, extracted and resolved.

The present invention finds broad applicability in the field of business where data files are shared among many different users and across multiple disciplines. Hidden data in such files raises security concerns should the data file reach an audience other than an intended audience. This is particularly so in the case of proprietary or classified information hidden in data files. The present invention resolves these concerns by identifying, classifying, extracting and, at the user request, removes or transforms such hidden data.

Figure 1:
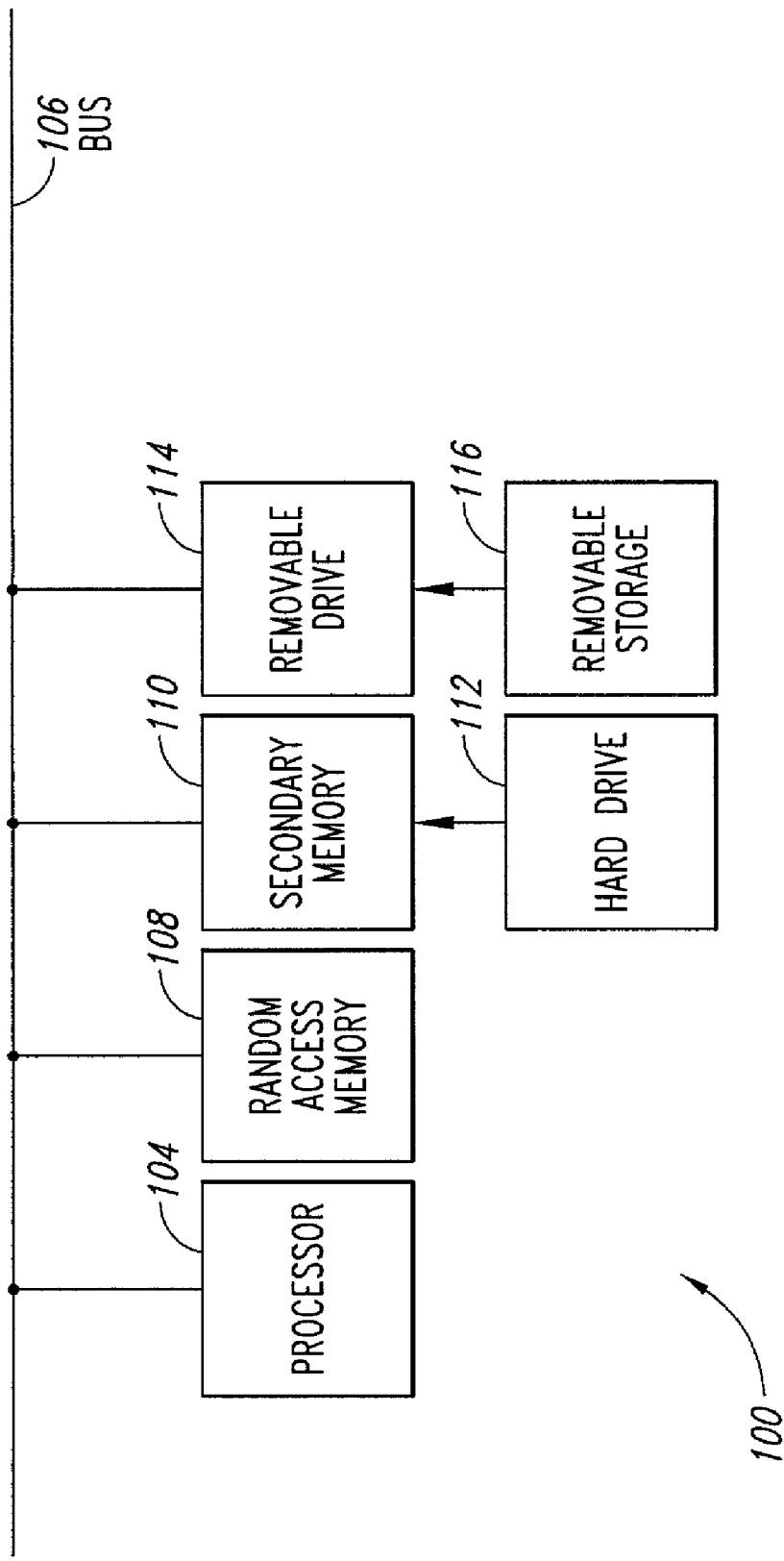
FIG. 1 is a schematic representation of a prior art computer system.

One embodiment of the present invention includes computer software executing within a computer system. FIG. 1 shows an exemplary computer system generally designated 100. The computer system 100 may include one or more processors, such as processor 104 connected to a bus 106.

The computer system 100 also may include a main memory 108, preferably random access memory (RAM), and a secondary memory 110. The secondary memory 110 may include a hard disk drive 112 and a removable storage device 114, such as a floppy disk drive, a magnetic tape drive, and a compact disk drive. The removable storage drive 114 reads from and writes to a removable storage unit 116 in a manner well known in the art.

Removable storage unit 116, also called a program storage device or a computer program product, represents computer readable media which may include a floppy disk, magnet tape, and a compact disk. The removable storage unit 116 may include a computer usable storage medium having therein stored computer software and/or data.

Computer programs (also called computer control logic) may be stored in main memory 108 and/or secondary memory 110. Such computer programs, when executed, enable the computer system 100 to perform the functions of the present invention as further described herein. In particular, the computer programs, when executed, enable the processor 104 to perform the functions of the present invention. Accordingly, such computer programs represent controllers of the computer system 100.

Alternative embodiments of the present invention are directed to a computer program product comprising a computer readable medium having code segments (computer software or control logic) stored therein. The code segments, when executed by the processor 104, causes the processor 104 to perform the functions as further described herein.

Further embodiments of the present invention are implemented primarily in hardware using, for example, a hardware state machine (not shown). Implementation of the hardware state machine so as to perform the functions described herein will be apparent to persons skilled in the relevant arts.

In a preferred embodiment of the invention, a computer software application may search for an executing copy of an application associated with a data file to be examined. If the application is not running, the application may be initiated in the background. The data file may then be opened for reading only within the application running in the background. The software application next may examine the data file for hidden entities as further described herein. An examination log may be generated whereby incidences of hidden entities are recorded in the examination log including major and minor warning messages. The examination may be displayed in a user interface. When warning messages are selected by a user, the application containing the hidden entities may be brought to the foreground.

The examination log may be divided into a plurality of sections. Each section documents data hiding findings resulting from the execution of particular data hiding identification algorithms as further described herein. High level progress information including for example sheet number, page number, or slide number being examined may be displayed in the examination log when the examination is executed. In addition, low-level progress information including for example cell, paragraph, shape, or other specific entity being examined may be displayed in a status bar at a bottom of an application user interface. When a data hiding incident is located within the data file, a warning message may be displayed in the examination log.

Major warning messages may be displayed which describe a possible data hiding incident and include a location of the data and a specific shape involved such as slide number or master name, for example. Minor warning messages may be displayed which do not include the location of the data.

Identified hidden data incidents can be resolved at the request of the user by removal, repair, or inclusion in a visible area. All of these options are available to the user at resolution initiation or as incidents are identified.

One embodiment of the present invention will be described with particular reference to Microsoft PowerPoint®, a presentation application distributed by Microsoft Corporation of Redmond, Wash. Those skilled in the art will recognize that the systems and method of the present invention are equally applicable to any data file capable of having data hidden therein.

In PowerPoint® presentations, the majority of information is defined on presentation slides. However, PowerPoint® also supports the concept of master slides. A master slide defines formatting for all slides or pages in the presentation. Each presentation has a master slide for each component, that is, a slide master for each slide, a title master for each title, a notes master for speaker's notes, and an audience handout master for audience handouts. PowerPoint® utilizes shapes to store the majority of information that is placed on the slides, notes and masters.

Figure 2:
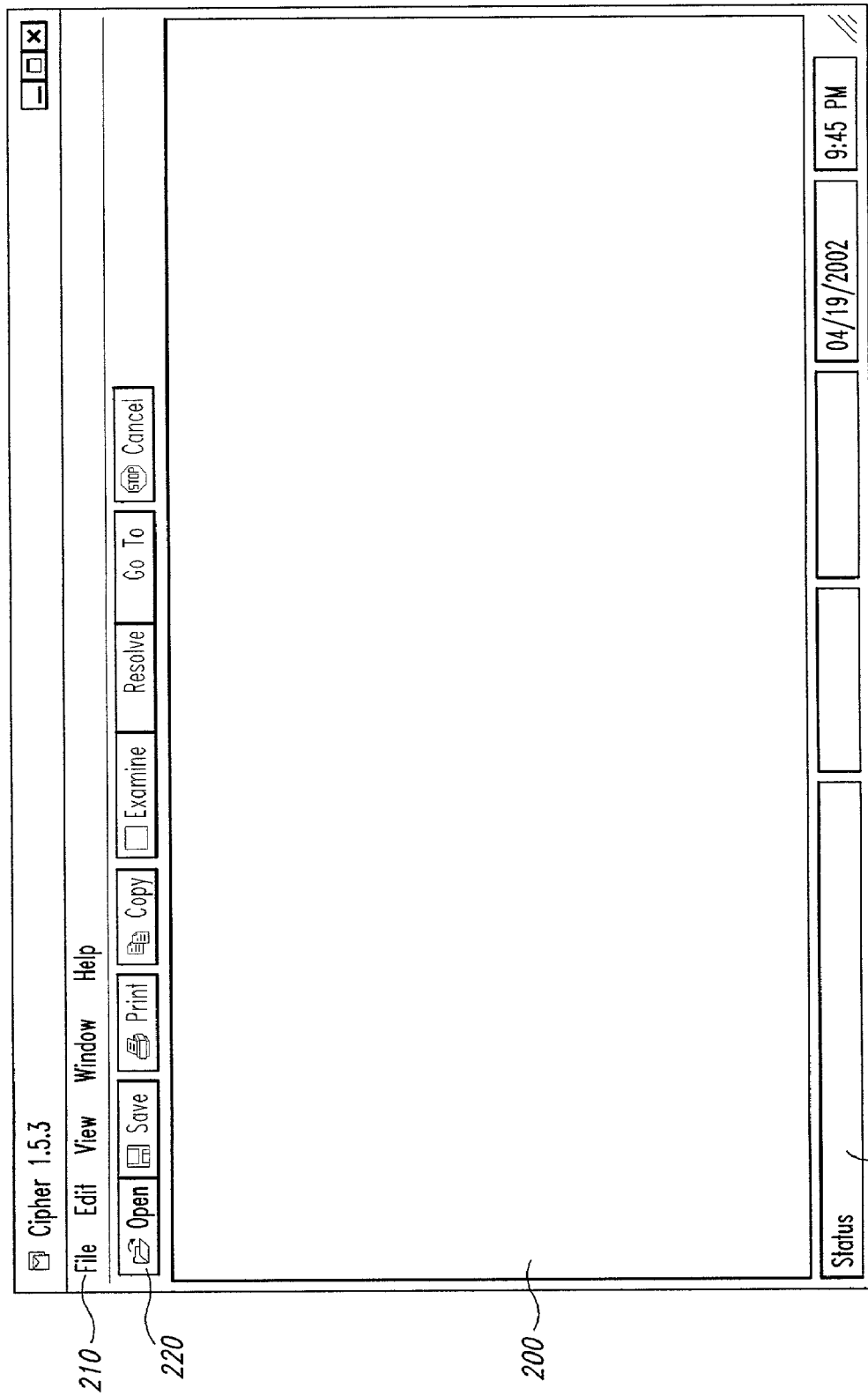
FIG. 2 is a screen shot of a user interface in accordance with the invention.

With reference to FIG. 2, a user interface 200 is shown including pull-down menus 210 and toolbar buttons or icons 220 as well known in the art. Also shown is a status bar 230. The software application of the present invention is a point-and-click based application preferably running on a Windows® (a registered trademark of Microsoft Corporation, Redmond, Wash.) operating system.

Figure 3:
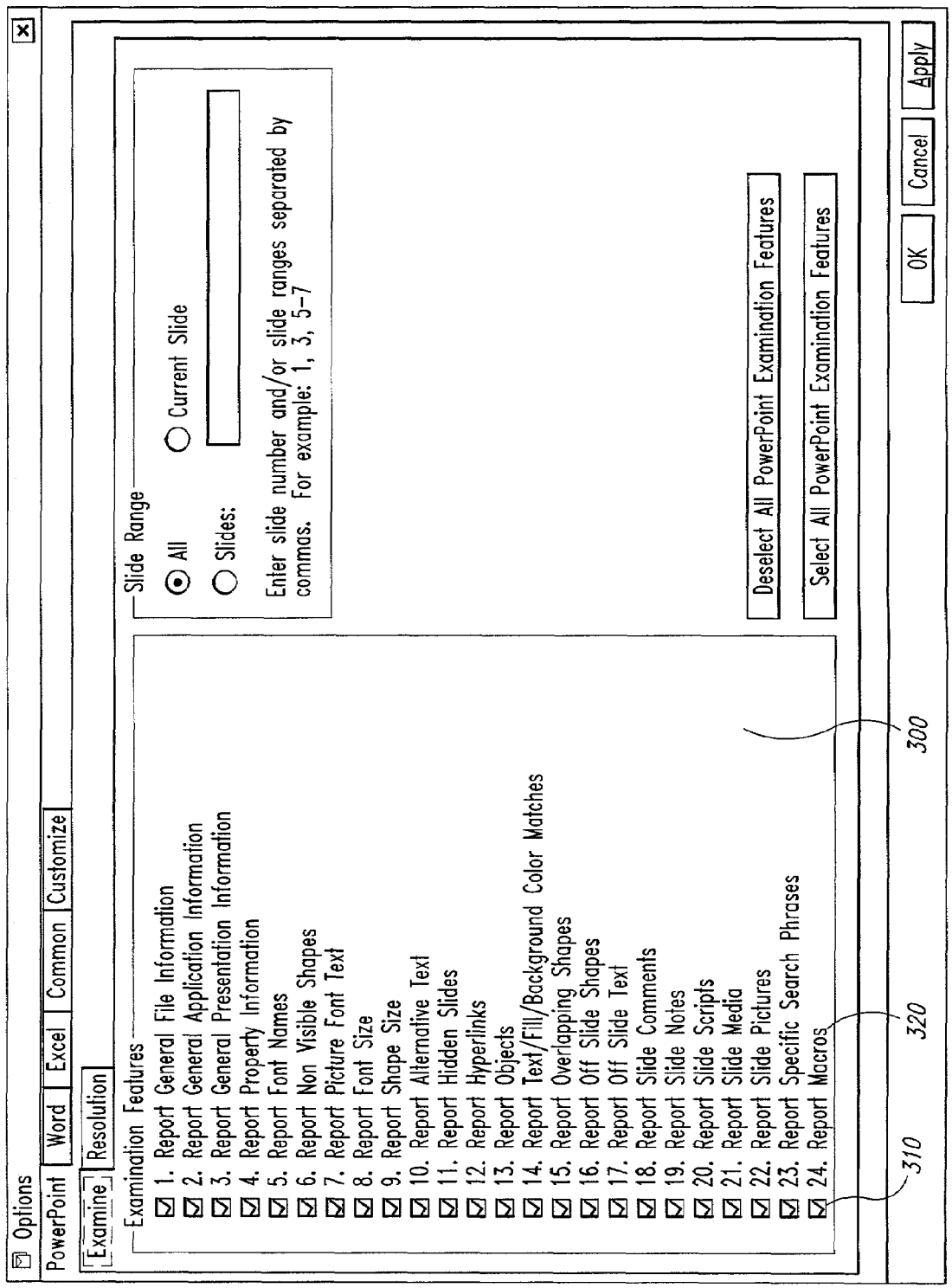
FIG. 3 is a screen shot of an options window in accordance with the invention.

With reference to FIG. 3, an options window 300 is shown including a plurality of examination features 310. Examination features 310 relate to the examination of a PowerPoint® presentation and include a plurality of reports 320 reported in the examination log as further described herein.

An exemplary routine of the present invention is illustrated in FIG. 4 and includes a routine "ExaminePPT/ResolvePPT" 400 for examining a PowerPoint® presentation for hidden entities in accordance with the present invention. In a step 401, in process setup is performed. Next, in a step 402, a PowerPoint® header is written and, in a step 403, a slide list is set up. In a step 404, a presentation header is written and, in a step 405, the presentation is ungrouped. Each selected examination feature is then run in a step 406 including a status bar 230 in update step 407. Finally, in steps 408, 409, and 410 a completion header is written, a summary is written, and in process cleanup is performed.

Figure 5:
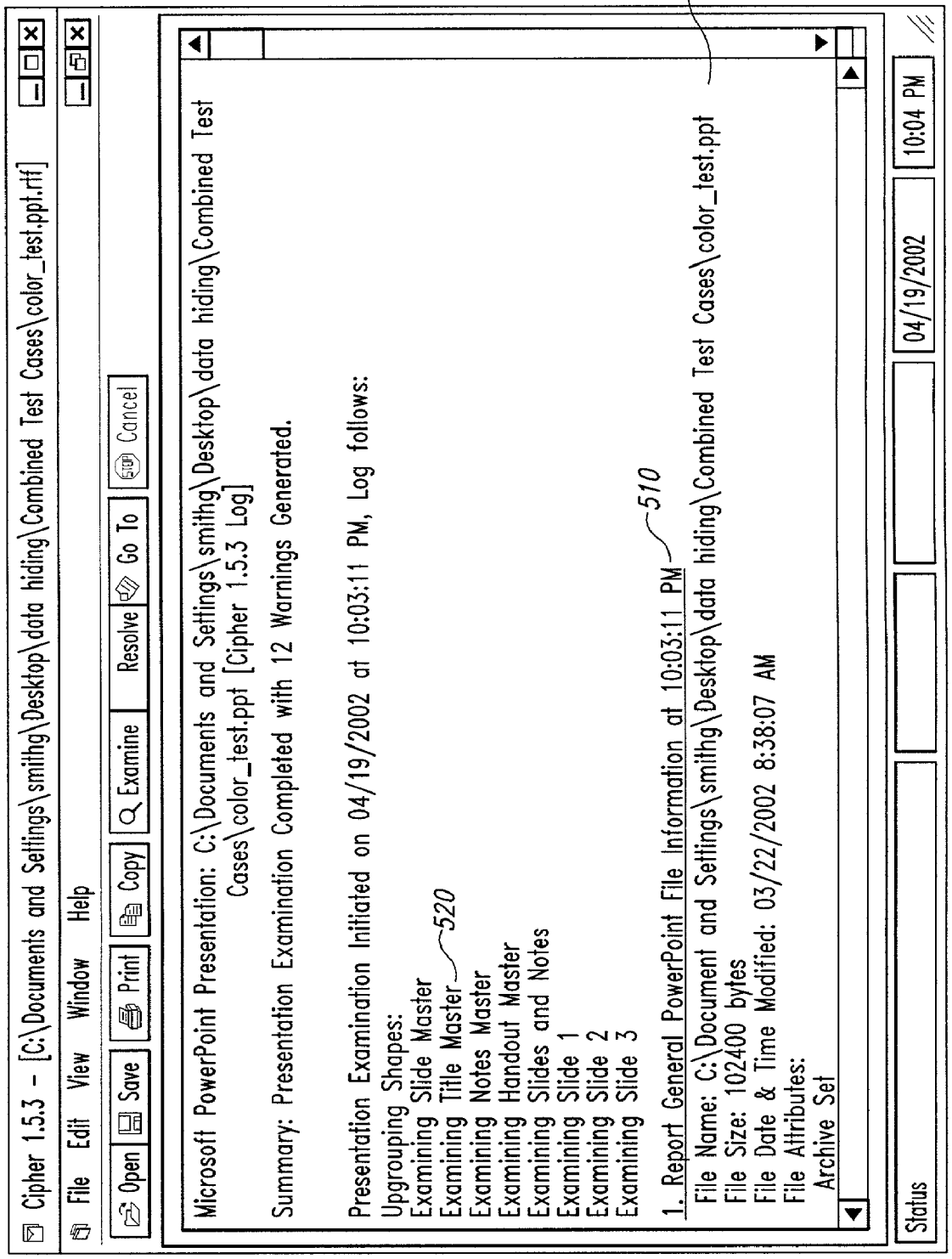
FIG. 5 is a screen shot of an examination log in accordance with the invention.

An exemplary examination log 500 is shown in FIG. 5 including a Report General File Information 510, the purpose of which will be further described with reference to FIG. 6. Documentation of a sequence 520 of the examination process is also shown.

Figure 6:
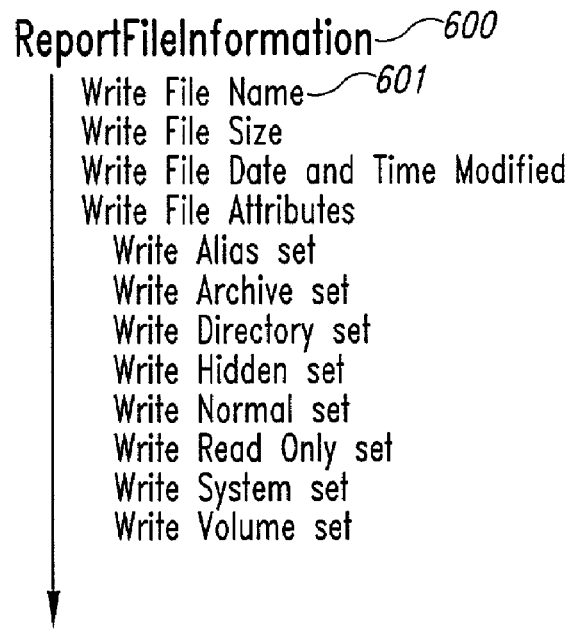
FIG. 6 is a pseudocode listing illustrating a routine in accordance with the invention.

In accordance with an aspect of the invention and with reference to FIG. 6, a routine "ReportFileInformation" 600 is shown including a plurality of write steps 601 which may generate the Report General File Information 510.

Figure 7:
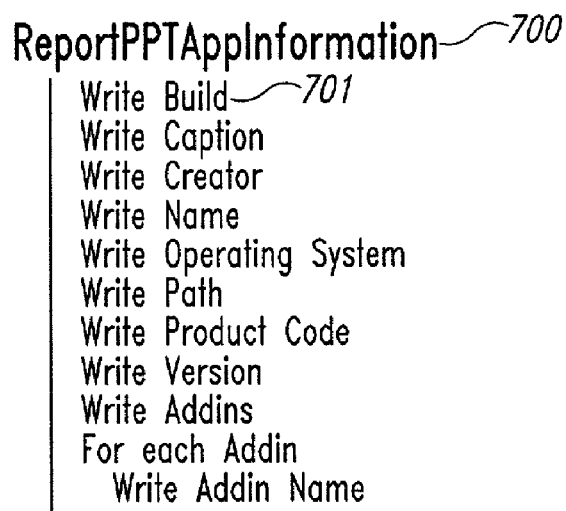
FIG. 7 is a pseudocode listing illustrating a routine in accordance with the invention.

In accordance with another aspect of the invention, a routine "ReportPPTAppInformation" 700 is shown in FIG. 7 and includes a plurality of write steps 701 for reporting specific information regarding the particular application associated with the data file being examined. Such information may aid a software developer in determining if a reported warning is version dependent, for example.

PowerPoint® supports the definition of high-level presentation properties such as presentation name, path, template, and masters defined, for example. In addition, built-in and custom properties can be defined. Each property includes a property name and a property value. The property values are not visible within the presentation, and as such, data can be inadvertently hidden in the property values.

In accordance with yet another aspect of the invention, a routine "ReportPPTPresInformation" 800 is shown in FIG. 8 including a plurality of write steps 801 for identifying the data file being examined. A routine 802 may include a step 803 for determining if each tag has a value. If the tag has value, in a step 804, a tag string length is compared to a user setting and if the tag string length is greater than the user setting, a data hiding incident is reported in a step 805.

A routine 810 may include a step 811 for determining if a built-in property has a value. If the built-in property has value, in a step 812, a built-in property string length is compared to a user setting and if the built-in property string length is greater than the user setting, a data hiding incident is reported in a step 813.

A routine 820 may include a step 821 for determining if a custom property has a value. If the custom property has a value, in a step 822, a custom property string length is compared to a user setting. If the custom property string length is greater than the user setting, a data hiding incident is reported in a step 823.

An exemplary examination log 900 including a major warning 901 indicating a built-in property string length greater than the user setting is shown in FIG. 9.

Figure 10:
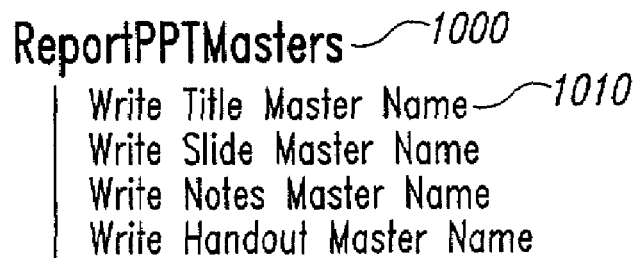
FIG. 10 is a pseudocode listing illustrating a routine in accordance with the invention.

With reference to FIG. 10 and in accordance with another aspect of the invention, a routine "ReportPPTMasters" 1000 may include a plurality of write steps 1010 for generating a report listing which masters are defined in the presentation being examined.

Figure 11:
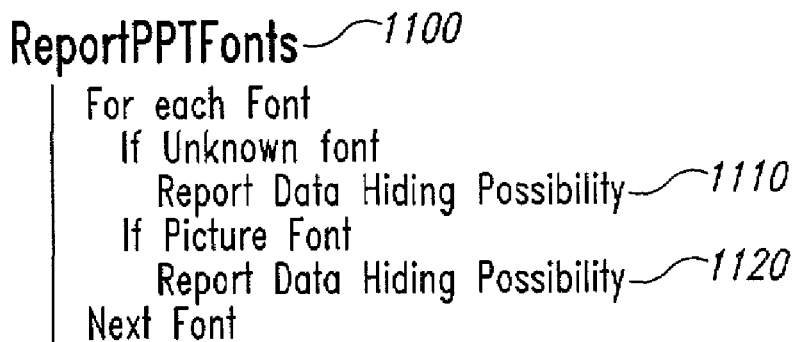
FIG. 11 is a pseudocode listing illustrating a routine in accordance with the invention.

PowerPoint® maintains an internal list of all fonts used in a presentation. In accordance with an aspect of the invention a routine "ReportPPTFonts" 1100 may include a step 1110 for reporting an unknown font and a step 1120 for reporting a picture font as shown in FIG. 11. An exemplary examination log 1200 including a plurality of minor warnings 1210 is shown in FIG. 12.

In PowerPoint®, shapes contain the majority of text, pictures, links, and objects. Each shape has a visibility attribute that can be set programmatically or via a macro. A shape whose visibility attribute is set becomes non-visible to those viewing the presentation. As such, these shapes can hide data. Non-visible shapes can be placed on slides, note pages, the note master, the slide master, the title master, and the handout master.

A routine "ReportPPTShapeVisiblity" 1300 in accordance with an aspect of the invention may include a step 1310 for examining each shape on a slide master, a step 1320 for examining each shape on a title master, a step 1325 for examining each shape on a notes master, a step 1330 for examining each shape on a handout master, and a step 1340 for examining each shape on each slide and associated slide notes as shown in FIGS. 13*a* and 13*b*. In a step 1350, each shape that is determined to not be visible in steps 1310 through 1340 is examined and in a step 1351 the text is obtained. In a step 1360, a determination is made whether resolution of the not visible shape is in process. If resolution is in process, in a step 1361 the shape is made visible, resolution is reported in a step 1362, and the shape text is written in a step 1363. If resolution is not in process, then in a step 1370 a data hiding incident is reported and the shape text is written. An exemplary examination log 1400 is shown in FIG. 14 including a plurality of major warnings 1410.

Picture fonts are defined in PowerPoint® as those fonts whose characters are depicted by pictures. Data can be hidden when picture fonts are used as a viewer cannot visually understand the information being portrayed by the text. In addition, text may contain mixed fonts. Picture fonts can be defined on shapes and placed on slides, notes pages, the notes master, the slide master, the title master, and the handout master.

Figure 16:
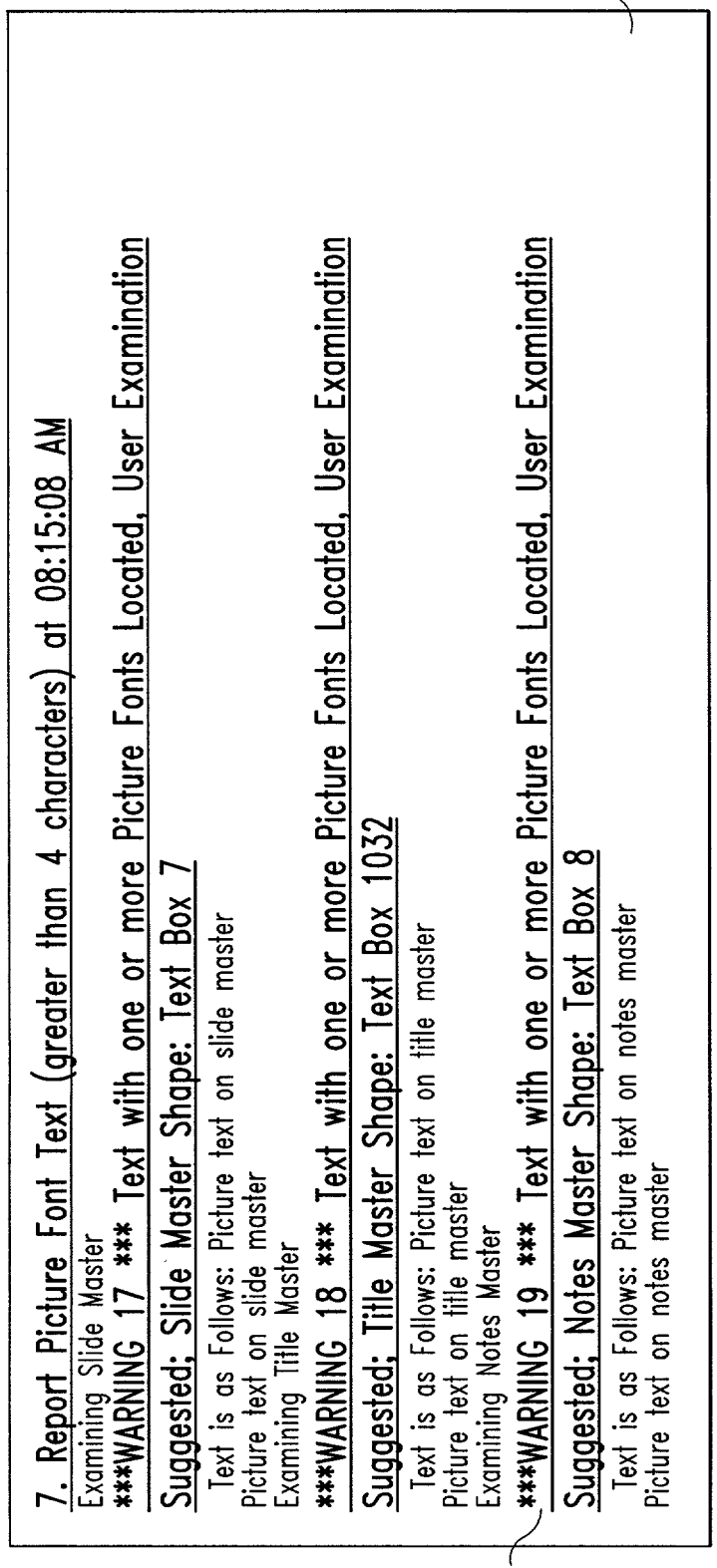
FIG. 16 is a screen shot of an examination log in accordance with the invention.

In accordance with an aspect of the invention a routine "ReportPPTPictureFontText" 1500 may include a step 1510 for examining a shape picture font for each shape on a slide master, a step 1520 for examining a shape picture font for each shape on a title master, a step 1530 for examining a shape picture font for each shape on a notes master, a step 1540 for examining a shape picture font for each shape on a handout master, and a step 1550 for examining each shape picture font on each slide and associated slide notes as shown in FIGS. 15*a*, 15*b*, and 15*c*. In a step 1560 each shape identified in steps 1510 through 1550 as having a shape picture font may be examined. Based on shape type, either a text frame or text effect may be determined. In steps 1570 and 1580, text fonts that are picture fonts and text effect fonts that are picture fonts are reported. An exemplary examination log 1600 is shown in FIG. 16 including a plurality of major warnings 1610.

Data can be hidden in data files in fonts that are too small or too large to be read. Very small text can be misinterpreted as lines. Very large text can be misinterpreted as shapes and/or the slide background. Small fonts may be defined as those fonts whose size is less than 5 points. Large fonts may be defined as those fonts whose size is greater than 100 points. Large and small fonts can be defined on text, within a shape, and placed on or off slides, notes pages, the notes master, the slide master, the title master, and the handout master.

Figure 17C:
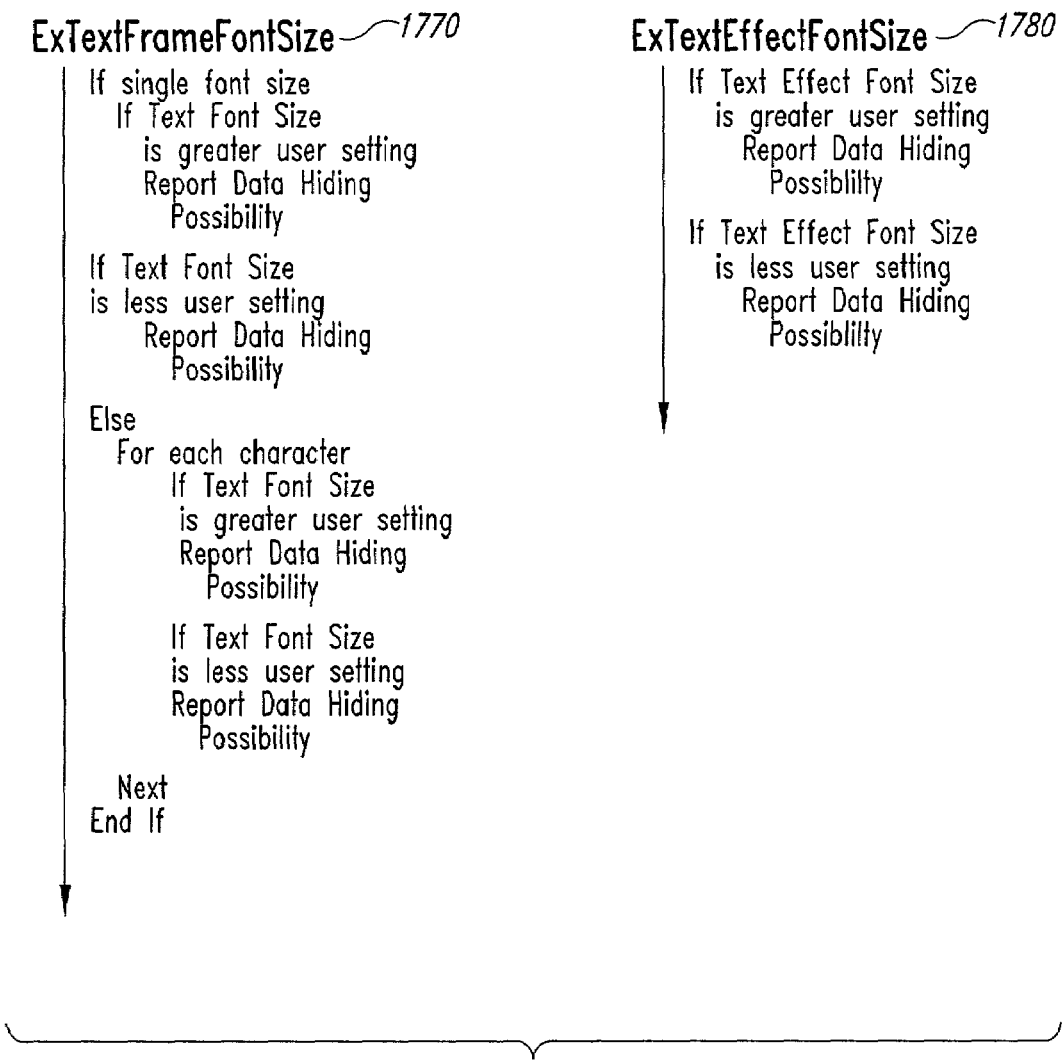

A routine "ReportPPTFontSize" 1700 in accordance with an aspect of the invention may include a step 1710 for examining a shape font size for each shape on a slide master, a step 1720 for examining a shape font size for each shape on a title master, a step 1730 for examining a shape font size for each shape on a notes master, a step 1740 for examining a shape font size for each shape on a handout master, and a step 1750 for examining a shape font size on each slide and associated slide notes as shown in FIGS. 17*a*, 17*b*, and 17*c*. In a step 1760 each shape identified in steps 1710 through 1750 as having a shape font size may be examined. Based on shape type, either a text frame or text effect may be determined. In steps 1770 and 1780, text font sizes that are greater than or less than a user setting and text effect font sizes that are greater than or less than a user setting are reported. In addition, text that contains mixed font sizes is examined character by character and warnings are issued when user settings are exceeded. An exemplary examination log 1800 is shown in FIG. 18 including a plurality of major warnings 1810.

Data can be hidden in data files in shapes that are too small or too large to be interpreted. Very small shapes can be misinterpreted as lines. Very large shapes can cover other shapes, possibly hiding data. Small shapes may be defined as those shapes whose size is less than 18 points. Large shapes may be defined as those shapes whose size is greater than 1000 points. Large and small shapes can be placed on or off slides, notes pages, the notes master, the slide master, the title master, and the handout master.

In accordance with an aspect of the invention a routine "ReportPPTShapeSize" 1900 may include a step 1910 for examining a shape size for each shape on a slide master, a step 1920 for examining a shape size for each shape on a title master, a step 1930 for examining a shape size for each shape on a notes master, a step 1940 for examining a shape size for each shape on a handout master, and a step 1950 for examining a shape size on each slide and associated slide notes as shown in FIGS. 19*a*, 19*b*, and 19*c*. In a step 1960 each shape identified in steps 1910 through 1950 as having a shape font size may be examined. Based on shape type, either a text frame or text effect may be determined. In steps 1970 and 1980, shape widths that are less than a user setting and shape widths and heights that are greater than a user setting are reported. An exemplary examination log 2000 is shown in FIG. 18 including a plurality of major warnings 2010.

Alternative text can be defined on various shapes. Web browsers display alternative text while pictures are loading or if they are missing. Web search engines use alternative text to help find web pages. As alternative text is not visible unless every shape in a presentation is examined, the present invention generates warnings when alternative text is located that does not match the text of the shape. Alternative text can be defined on shapes and placed on or off slides, notes pages, the notes master, the slide master, the title master, and the handout master.

A routine "ReportPPTAlternativeText" 2100 in accordance with an aspect of the invention may include a step 2110 for examining a shape alternative text for each shape on a slide master, a step 2120 for examining a shape alternative text for each shape on a title master, a step 2130 for examining a shape alternative text for each shape on a notes master, a step 2140 for examining a shape alternative text for each shape on a handout master, and a step 2150 for examining a shape alternative text on each slide and associated slide notes as shown in FIGS. 21*a*, 21*b*, and 21*c*. In a step 2160 each shape identified in steps 2110 through 2150 as having a shape alternative text may be examined. Based on shape type, either a text frame or text effect may be determined. In a step 2170, a data hiding incident is reported if text exists and it is not equal to the alternative text, or, if text does not exist, alternative text exists. In a step 2180, a data hiding incident is reported if effect text exists and it is not equal to the alternative text, or, if effect text does not exist, alternative text exists. An exemplary examination log 2200 is shown in FIG. 18 including a plurality of major warnings 2210.

Hidden slides are those slides that have been hidden from the slide show. When a presentation is viewed in the slide show mode, these hidden slides are not visible, yet they still exist in the presentation. In accordance with an aspect of the invention a routine "ReportPPTHiddenSlides" 2300 may include a step 2310 for examining each slide to determine if it is hidden and a step 2320 for reporting a data hiding incident if it is hidden as shown in FIG. 23. An exemplary examination log 2400 is shown in FIG. 24 including a plurality of major warnings 2410.

Hyperlinks can provide direct access to information in other files or presentation locations. Such links can provide access to files and presentation areas where security has not been properly defined. Hyperlinks can be defined on shapes and placed on or off slides, notes pages, the notes master, the slide master, the title master, and the handout master. In accordance with an aspect of the invention a routine "ReportPPTHyperLinks" 2500 may include a step 2510 for examining a slide master to determine the existence of a hyperlink and a step 2520 for reporting a data hiding incident as shown in FIG. 25. In a step 2530 a title master may be examined to determine the existence of a hyperlink and in a step 2540 the existence of a hyperlink may be reported. In a step 2550 each slide may be examined to determine the existence of a hyperlink and in a step 2560 the existence of a hyperlink may be reported. An exemplary examination log 2600 is shown in FIG. 26 including a plurality of major warnings 2610.

Objects can provide direct access to information in other data files. Complete application data sets can be included within a presentation slide. For example, when an Excel® (a registered trademark of the Microsoft Corporation, Redmond, Wash.) chart is added to a PowerPoint®) slide using the cut and paste functions of these applications, the entire Excel® workbook is added to the slide. Objects can be defined on shapes and placed on or off slides, notes pages, the notes master, the slide master, the title master, and the handout master.

In accordance with an aspect of the invention a routine "ReportPPTObjects" 2700 may include a step 2710 for examining each shape object of each shape on a slide master, a step 2720 for examining each shape object for each shape on a title master, a step 2730 for examining each shape object for each shape on a notes master, a step 2740 for examining each shape object for each shape on a handout master, and a step 2750 for examining each shape object on each slide and associated slide notes as shown in FIGS. 27*a* and 27*b*. In a step 2760 each object type may be examined and reported. An exemplary examination log 2800 is shown in FIG. 28 including a plurality of major warnings 2810.

In areas where the color of the text matches or nearly matches the shape fill color, or if the fill is transparent the text color matches or nearly matches the slide background, the visibility of the text may be impaired. Text where text color and fill/background match or nearly match can be defined on shapes and placed on or off slides, notes pages, the notes master, the slide master, the title master, and the handout master.

A routine "ReportPPTTextFillColorMatch" 2900 in accordance with an aspect of the invention may include a step 2910 for examining each shape text fill color match of each shape on a slide master, a step 2920 for examining each shape text fill color match for each shape on a title master, a step 2930 for examining each shape text fill color match for each shape on a notes master, a step 2940 for examining each shape text fill color match for each shape on a handout master, and a step 2950 for examining each shape text fill color match on each slide and associated slide notes as shown in FIGS. 29*a* and 29*b*. In a step 2960 if a shape has a text frame a background color, a font color, and a fill color are determined. If the fill is transparent, then in a step 2961 a data hiding incident is reported if the front exactly matches the background. In a step 2962, if the font nearly matches the background, a data hiding incident is reported. If shape does not have a text frame, then in a step 2963 a data hiding incident is reported if the font exactly matches the fill. In a step 2964, a data hiding incident is reported if the font nearly matches the fill. An exemplary examination log 3000 is shown in FIG. 30 including a plurality of major warnings 3010.

In areas where one shape overlaps another shape, the visibility of information may be impaired. Overlapping shapes can be defined on slides, notes pages, the notes master, the slide master, the title master, and the handout master. The present invention does not report all cases of shape overlap. Typically, slight overlaps do not hide information. Slight overlaps may be defined as 18 points. Furthermore, situations where a front shape of an overlapping shape set is transparent and situations where a back shape of an overlapping shape set has no text are not reported.

Figure 31A:
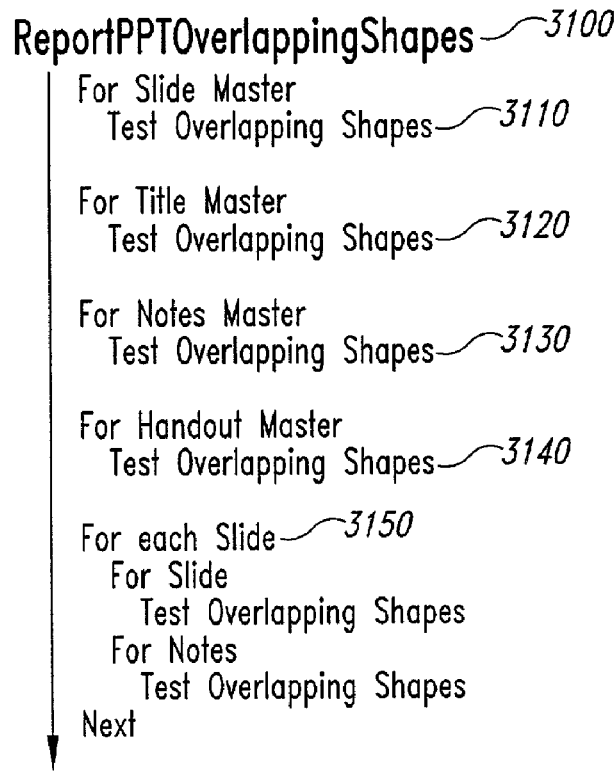
Figure 31B:
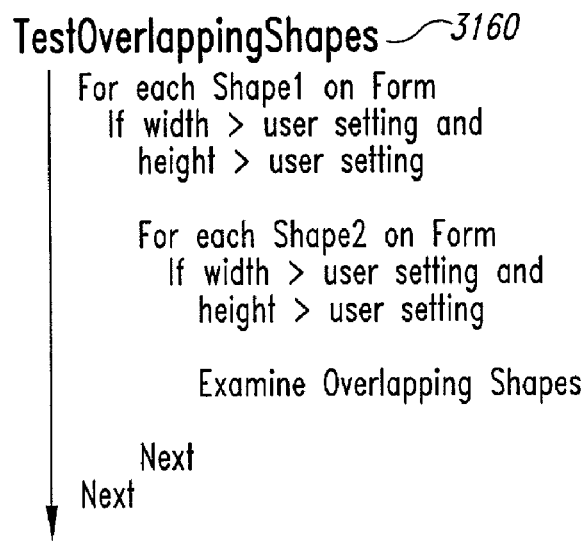

In accordance with an aspect of the invention, a routine "ReportPPTOverlappingShapes" 3100 may include a step 3110 for testing overlapping shapes for a slide master, a step 3120 for testing overlapping shapes for a title master, a step 3130 for testing overlapping shapes for a notes master, a step 3140 for testing overlapping shapes for a handout master, and a step 3150 for testing overlapping shapes for each slide and associated notes as shown in FIGS. 31*a*, 31*b*, and 31*c*. In a step 3160 for each overlapping shape on a form, a width and height of each overlapping shape is compared to user settings. If the overlapping shapes are determined in step 3160 to overlap more than slightly, as determined by the user settings, then in a step 3162 a data hiding incident is reported. An exemplary examination log 3200 is shown in FIG. 32 including a plurality of major warnings 3210.

In PowerPoint®, shapes contain the majority of text, pictures, links, and objects. These shapes can be placed on and off the area of a slide. As such, these shapes can be placed above, below, to the right, and to the left of a slide. In addition to slides, shapes can be placed off note pages, off the note master, off the slide master, off the title master, and off the handout master.

A routine "ReportPPTOffSlideShapes" 3300 in accordance with an aspect of the invention may include a step 3310 for examining off slide shapes for each slide master, a step 3320 for examining off slide shapes for a title master, a step 3330 for examining off slide shapes for a notes master, a step 3340 for examining off slide shapes for a handout master, and a step 3350 for examining off slide shapes for each slide and associated notes as shown in FIGS. 33*a* and 33*b*. In a step 3360, for each off slide shape a data hiding incident is reported. An exemplary examination log 3400 is shown in FIG. 34 including a plurality of major warnings 3410.

Using the margin capability of PowerPoint®, it is possible to locate shape-associated text off the area of a slide. As such, text can be located above, below, to the right, and to the left of a slide. In addition to slides, this text can be placed off note pages, off the note master, off the slide master, off the title master, and off the handout master.

In accordance with an aspect of the invention a routine "ReportPPTOffSlideText" 3500 may include a step 3510 for examining off slide text for each slide master, a step 3520 for examining off slide text for a title master, a step 3530 for examining off slide text for a notes master, a step 3540 for examining off slide text for a handout master, and a step 3550 for examining off text shapes for each slide and associated notes as shown in FIGS. 35*a* and 35*b*. In a step 3560 for each off slide text a data hiding incident is reported. An exemplary examination log 3600 is shown in FIG. 36 including a plurality of major warnings 3610.

In PowerPoint®, comments can be defined on slides. As comments can be disabled from view they are a possible data hiding concern. Multiple comments can be defined on a single slide. A routine "ReportPPTSlideComments" 3700 in accordance with an aspect of the invention may include a step 3710 for determining if a shape type is a comment for each shape on each slide as shown in FIG. 37. If a shape type is a comment, in a step 3720 a data hiding incident is reported. An exemplary examination log 3800 is shown in FIG. 38 including a plurality of major warnings 3810.

PowerPoint® allows notes to be assigned to each slide in a presentation. The notes may not be visible to the individual viewing the presentation when a notes pane is disabled. In accordance with an aspect of the invention, a routine "ReportPPTSlideNotes" 3900 may include a step 3910 in which a determination is made whether a shape type is not a placeholder for each shape on each notes page as shown in FIG. 39. If the shape type is not a placeholder, then in a step 3920 a data hiding incident is reported. An exemplary examination log 4000 is shown in FIG. 40 including a plurality of major warnings 4010.

Scripts can be defined within PowerPoint® and can be executed in response to a specific presentation event such as changing a slide or mouse clicking a shape, for example. Information can be defined within a script or accessed via a script that may not be available by simple viewing of the presentation. Scripts can be defined on slides, the slide master, and the title master.

A routine "ReportPPTSlideScripts" 4100 in accordance with an aspect of the invention may include a step 4110 in which a data hiding incident is reported for each script found on a slide master as shown in FIG. 41. In a step 4120 a data hiding incident is reported for each script found on a title master and in a step 4130 a data hiding incident is reported for each script found on each slide. An exemplary examination log 4140 is shown in FIG. 41*a* including a plurality of major warnings 4150.

Sound and video media can be defined within PowerPoint® that can be executed in response to a specific presentation event such as changing a slide or mouse clicking a shape, for example. Information can be defined within a sound media and video media that may not be available by simple viewing of the presentation. Sound and video media can be defined on slides, the notes master, the handout master, the slide master, and the title master. In accordance with an aspect of the invention a routine "ReportPPTSlideMedia" 4200 may include a step 4210 for examining each shape on a slide master for slide media, a step 4220 for examining each shape on a title master for slide media, a step 4230 for examining each shape on a notes master for slide media, a step 4240 for examining each shape on a handout master for slide media, and a step 4250 for examining each shape of each slide and associated notes for slide media as shown in FIGS. 42*a* and 42*b*. In a step 4260, each slide media identified in steps 4210 through 4250 is reported as a data hiding incident. An exemplary examination log 4300 is shown in FIG. 43 including a plurality of major warnings 4310.

Figure 44A:
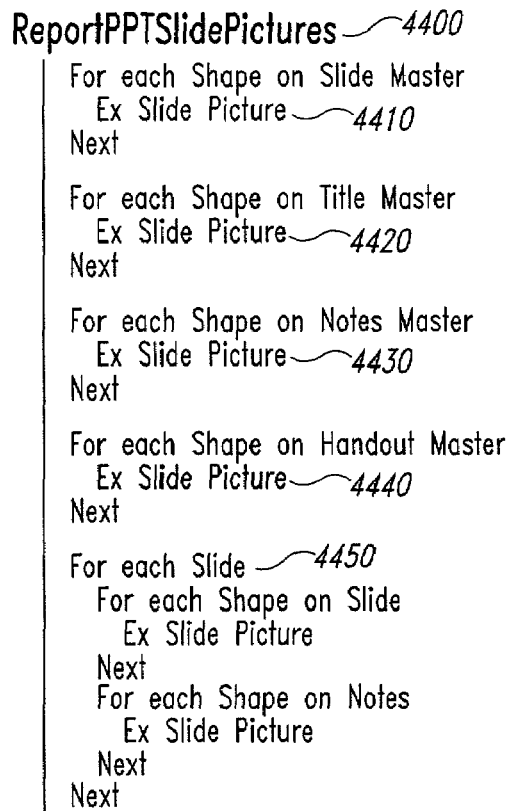
FIGS. 44a and 44b are a pseudocode listing illustrating a routine in accordance with the invention.
Figure 44B:
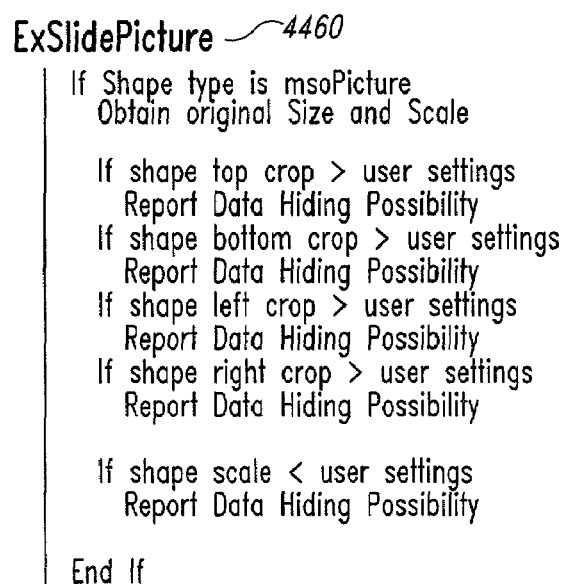

Pictures can be copied into PowerPoint® such that the content of the picture is either significantly reduced in scale or cropped, thereby obscuring it's content. Pictures can be defined on slides, on notes pages, the notes master, the handout master, the slide master, and the title master. A routine "ReportPPTSlidePictures" 4400 in accordance with an aspect of the invention may include a step 4410 for examining each shape of a slide master for pictures, a step 4420 for examining each shape of a title master for pictures, a step 4430 for examining each shape of a notes master for pictures, a step 4440 for examining each shape of a handout master for pictures, and a step 4450 for examining each shape on each slide and associated notes for pictures as shown in FIGS. 44*a* and 44*b*. In a step 4460, for each picture found in steps 4410 through 4450, an original size and scale is obtained, compared to user settings, and a data hiding incident is reported either the picture is cropped more than the user settings or is scaled less than a user setting. An exemplary examination log 4500 is shown in FIG. 45 including a plurality of major warnings 4510.

Certain phrases are key to possible hidden data and/or security situations. Such phrases include "secret", "proprietary", "limited", "classified", and "confidential." Such text can be defined on slides and notes pages, the notes master, the handout master, the slide master, and the title master. In accordance with an aspect of the invention, a routine "ReportPPTSearchPhrases" 4600 may include a step 4610 for examining each shape on a slide master for defined phrases (including user defined phrases), a step 4620 for examining each shape on a title master for defined phrases, a step 4630 for examining each shape on a notes master for defined phrases, a step 4640 for examining each shape on a handout master for defined phrases, and a step 4650 for examining each shape on each slide and associated notes for defined phrases as shown in FIGS. 46*a* and 46*b*. In a step 4660, a data hiding incident is reported for each shape containing a defined phrase. An exemplary examination log 4700 is shown in FIG. 47 including a plurality of major warnings 4710.

Macros in PowerPoint® presentations allow information to be hidden from view. Macros can be defined on slides and notes pages, the notes master, the handout master, the slide master, and the title master. A routine "ReportPPTSearchMacros" 4800 in accordance with an aspect of the invention may include a step 4810 for examining each shape in a slide master for macros, a step 4820 for examining each shape in a title master for macros, and a step 4830 for examining each shape in each slide and associated notes for macros as shown in FIGS. 48*a* and 48*b*. In a step 4840, a data hiding incident is reported for each macro found in steps 4810 through 4830.

Figure 49B:

A routine "ResolveHiddenData" 4900 in accordance with an aspect of the invention may include a step 4910 in which a determination may be made whether user action for resolving data hiding incidents has been taken as shown in FIGS. 49*a* and 49*b*. If user action has been taken, then in a step 4920 a type of resolution may be selected including a step 4930 in which data hiding incidents may be removed. An exemplary report log 5000 is shown in FIG. 50 including a plurality of reports 5010.

Figure 51:
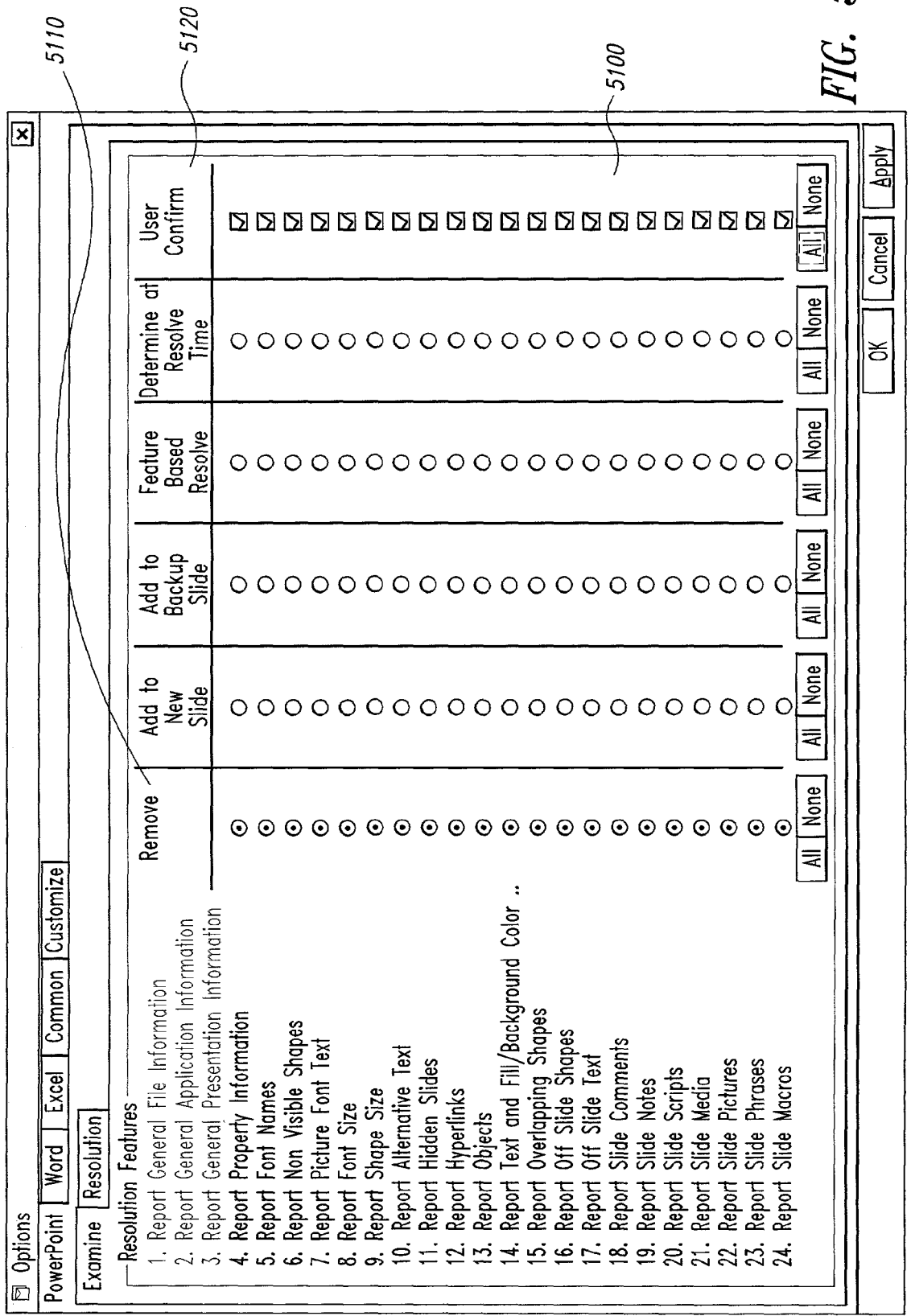
FIG. 51 is a screen shot of a user interface in accordance with the invention.

In FIG. 51, an exemplary user interface 5100 may include a plurality of user options 5110 for removing data hiding incidents, adding data hiding incidents to a new slide, adding data hiding incidents to a backup slide, feature based resolution, and determining resolution at a resolve time. The user interface 5100 may also include user confirmation 5120.

The system and method of the invention provides for identifying, classifying, extracting, and resolving hidden information from data files. The routines described herein are operable to examine a data file for hidden entities and generate an examination log whereby incidences of hidden entities are recorded including major and minor warning messages. The examination may be displayed in a user interface. When warning messages are selected by a user, the application containing the hidden entities may be brought to the foreground for user action and resolution.

It should be understood, of course, that the foregoing relates to preferred embodiments of the invention and that modifications may be made without departing from the spirit and scope of the invention as set forth in the following claims.

I claim:

1. A computer-implemented method for identifying hidden entities present within a data file that is associated with an application and that is viewable on a display by a user, the method comprising:
   searching for an executing copy of the application, the application providing for the creation and editing of the data file;
   initiating the application in a background if the application is not running to allow the data file to be opened within the application;
   opening the data file within the application for reading only;
   directing the examination of the data file by the application for entities within the data file that are not visible on the display during normal display of the data file within the application;
   reporting an incident of a hidden entity identified by the examining of the data file;
   generating an examination log of incidents of hidden entities; and
   resolving the incidents of hidden entities.

2. The method of claim 1, wherein examining the data file further comprises identifying an entity within the data hidden during normal viewing of the data within the application.

3. The method of claim 1, wherein examining the data file further comprises identifying a non visible shape.

4. The method of claim 1, wherein examining the date file further comprises identifying a picture font text.

5. The method of claim 1, wherein examining the data file further comprises identifying a font size.

6. The method of claim 1, wherein examining the data file further comprises identifying a shape size.

7. The method of claim 1, wherein examining the data file further comprises identifying an alternative text.

8. The method of claim 1, wherein examining the data file further comprises identifying a hidden slide.

9. The method of claim 1, wherein examining the data file further comprises identifying a hyperlink.

10. The method of claim 1, wherein examining the data file further comprises identifying an object.

11. The method of claim 1, wherein examining the data file further comprises identifying a text and fill/background color match.

12. The method of claim 1, wherein examining the data file further comprises identifying overlapping shapes.

13. The method of claim 1, wherein examining the data file further comprises identifying an off slide shape.

14. The method of claim 1, wherein examining the data file further comprises identifying an off slide text.

15. The method of claim 1, wherein examining the data file further comprises identifying a slide comment.

16. The method of claim 1, wherein examining the data file further comprises identifying a slide note.

17. The method of claim 1, wherein examining the data file further comprises identifying a slide script.

18. The method of claim 1, wherein examining the data file further comprises identifying a slide media.

19. The method of claim 1, wherein examining the data file further comprises identifying a slide picture.

20. The method of claim 1, wherein examining the data file further comprises identifying a search phase.

21. The method of claim 1, wherein examining the data file further comprises identifying a macro.

22. A computer readable media for identifying, classifying, extracting and resolving hidden entities from a computer-readable data file associated with at least one application, comprising:
   a code segment for searching for an executing copy of the application, the application providing for the creation and editing of the data file;
   a code segment for initiating the application in a background if the application is not running to allow the data file to be opened within the application;
   a code segment for opening the data file within the application, for reading only;
   a code segment for directing the examination of the data file within the application for entities hidden within the data file that are not visible during normal viewing of data included in the data file;
   a code segment for reporting incidents of the hidden entities;
   a code segment for generating an examination log of incidents of hidden entities; and
   a code segment for resolving the incidents of hidden entities;
   wherein each of the aforementioned code segments comprise control logic.

23. The computer readable media of claim 22, wherein the code segment for examining the data file for hidden entities further comprises a code segment for reporting a hidden entity.

24. The computer readable media of claim 22, wherein the code segment for examining the data file includes a code segment for reporting a non visible.

25. The computer readable media of claim 22, wherein the code segment for examining the data file includes a code segment for reporting a font text.

26. The computer readable media of claim 22, wherein the code segment for examining the data file includes a code segment for reporting a font size.

27. The computer readable media of claim 22, wherein the code segment for examining the data file includes a code segment for reporting a shape size.

28. The computer readable media of claim 22, wherein the code segment for examining the data file includes a code segment for reporting an alternative text.

29. The computer readable media of claim 22, wherein the code segment for examining the data file includes a code segment for reporting a hidden slide.

30. The computer readable media of claim 22, wherein the code segment for examining the data file includes a code segment for reporting a hyperlink.

31. The computer readable media of claim 22, wherein the code segment for examining the data file includes a code segment for reporting an object.

32. The computer readable media of claim 22, wherein the code segment for examining the data file includes a code segment for reporting a text and fill/background color match.

33. The computer readable media of claim 22, wherein the code segment for examining the data file includes a code segment for reporting overlapping shapes.

34. The computer readable media of claim 22, wherein the code segment for examining the data file includes a code segment for reporting an off slide shape.

35. The computer readable media of claim 22, wherein the code segment for examining the data file includes a code segment for reporting an off slide text.

36. The computer readable media of claim 22, wherein the code segment for examining the data file includes a code segment for reporting a slide comment.

37. The computer readable media of claim 22, wherein the code segment for examining the data file includes a code segment for reporting a slide note.

38. The computer readable media of claim 22, wherein the code segment for examining the data file includes a code segment for reporting a slide script.

39. The computer readable media of claim 22, wherein the code segment for examining the data file includes a code segment for reporting a slide media.

40. The computer readable media of claim 22, wherein the code segment for examining the data file includes a code segment for reporting a slide picture.

41. The computer readable media of claim 22, wherein the code segment for examining the data file includes a code segment for reporting a search phrase.

42. The computer readable media of claim 22, wherein the code segment for examining the data file includes a code segment for reporting a macro.

* * * * *